(12) United States Patent
Dent et al.

(10) Patent No.: US 6,996,375 B2
(45) Date of Patent: Feb. 7, 2006

(54) TRANSMIT DIVERSITY AND SEPARATING MULTIPLE LOOPBACK SIGNALS

(75) Inventors: Paul W. Dent, Pittsboro, NC (US); Kambiz C. Zangi, Durham, NC (US)

(73) Assignee: Ericsson Inc., Plano, TX (US)

( * ) Notice: Subject to any disclaimer, the term of this patent is extended or adjusted under 35 U.S.C. 154(b) by 229 days.

(21) Appl. No.: 10/367,145

(22) Filed: Feb. 14, 2003

(65) Prior Publication Data

US 2004/0203468 A1    Oct. 14, 2004

Related U.S. Application Data

(63) Continuation-in-part of application No. 10/135,095, filed on Apr. 30, 2002, and a continuation-in-part of application No. 09/945,002, filed on Aug. 31, 2001, and a continuation-in-part of application No. 09/939,006, filed on Aug. 24, 2001, and a continuation-in-part of application No. 09/915,896, filed on Jul. 26, 2001, and a continuation-in-part of application No. 09/915,895, filed on Jul. 26, 2001.

(51) Int. Cl.
*H04B 17/00* (2006.01)

(52) U.S. Cl. ................... 455/67.16; 455/67.11
(58) Field of Classification Search ............ 455/67.11, 455/67.16, 63.1, 69, 70
See application file for complete search history.

(56) References Cited

U.S. PATENT DOCUMENTS

| | | | |
|---|---|---|---|
| 4,995,057 A | | 2/1991 | Chung |
| 5,237,612 A | * | 8/1993 | Raith .................... 380/247 |
| 5,509,052 A | * | 4/1996 | Chia et al. ............. 455/465 |
| 5,557,676 A | * | 9/1996 | Naslund et al. ........ 380/247 |
| 5,887,027 A | | 3/1999 | Cohen et al. |
| 5,940,741 A | * | 8/1999 | Briancon et al. ........ 340/7.22 |
| 6,067,324 A | | 5/2000 | Harrison |
| 6,144,711 A | | 11/2000 | Raleigh et al. |

(Continued)

FOREIGN PATENT DOCUMENTS

EP     0936781    8/1999

(Continued)

OTHER PUBLICATIONS

Ying-Chang, Liang et al: "Transmit Antenna Array Techniques for Cellular CDMA Systems" Personal, Indoor and Mobile Radio Communications, 1998, The Ninth IEEE International Symposium on Boston, MA, USA, Sep. 8-11, 1998, New York, NY, USA, IEEE, US, Sep. 8, 1998, pp. 1396-1400, XP 010314608 ISBN: 0-7803-4872-9.

(Continued)

*Primary Examiner*—Nick Corsaro
*Assistant Examiner*—Raymond B. Persino

(57) ABSTRACT

A wireless communication network processes composite loop-back signals received at one or more network antennas from a plurality of mobile stations, each transmitting an individual, mobile-specific loop-back signal. Using its knowledge of the prior network-transmitted signal(s) from which the mobile stations derive their individual loop-back signals, and its knowledge of the mobile-specific loop-back signal modifications made by each of the mobile stations, the network derives mobile-specific downlink channel information based on processing the composite loop-back signals. That is, use of the mobile-specific loop-back signals enables the network to determine downlink channel estimates as between each participating network antenna and each participating mobile station to be used for transmit signal interference and/or power pre-compensation, for example. Mobile stations incorporate loop-back signal sample processors used to impart mobile-specific modifications to signal samples obtained from network-transmitted signals. The modified signal samples, thus "imprinted," are then transmitted back to the network.

44 Claims, 15 Drawing Sheets

U.S. PATENT DOCUMENTS

| | | | |
|---|---|---|---|
| 6,181,739 B1 * | 1/2001 | Ryde et al. | 375/227 |
| 6,434,366 B1 | 8/2002 | Harrison et al. | |
| 6,473,467 B1 | 10/2002 | Wallace et al. | |
| 6,597,908 B1 * | 7/2003 | Yu | 455/424 |
| 2002/0036996 A1 * | 3/2002 | Ozluturk et al. | 370/335 |

FOREIGN PATENT DOCUMENTS

| | | |
|---|---|---|
| EP | 1067710 | 1/2001 |
| EP | 1075122 | 1/2001 |
| EP | 1087545 | 3/2001 |
| EP | 1207645 | 5/2002 |
| WO | WO 9809381 | 2/1998 |
| WO | WO 9837671 | 8/1998 |
| WO | WO 9921375 | 4/1999 |
| WO | WO 0135548 | 5/2001 |
| WO | WO 0197474 | 12/2001 |
| WO | WO 0199453 | 12/2001 |

OTHER PUBLICATIONS

Kawakami, E et al: "Multi-Stage Interference Canceller Systems With Accurate Radio Channel Estimation Under Fading Environment" 1997 IEEE 6th International Conference on Universal Personal Communications Record. San Diego, Oct. 12-16, 1997, IEEE International Conference on Universal Personal Communications, New York, IEEE, US, vol. 2, Conf. 6, Oct. 12, 1997, pp. 475-479, XP010248754 ISBN: 0-7803-3777-8.

* cited by examiner

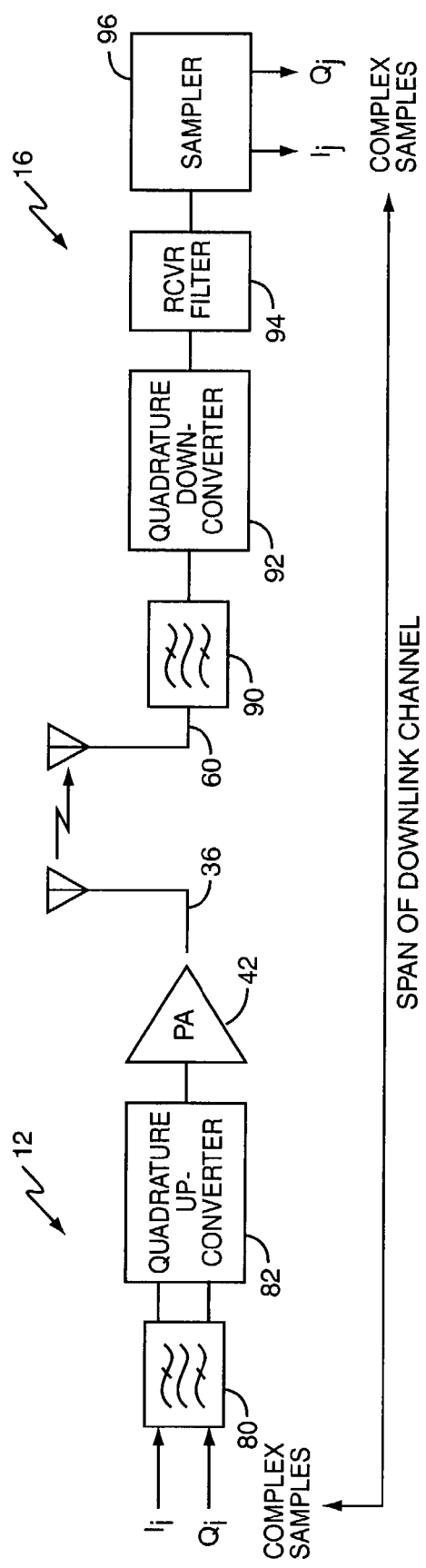
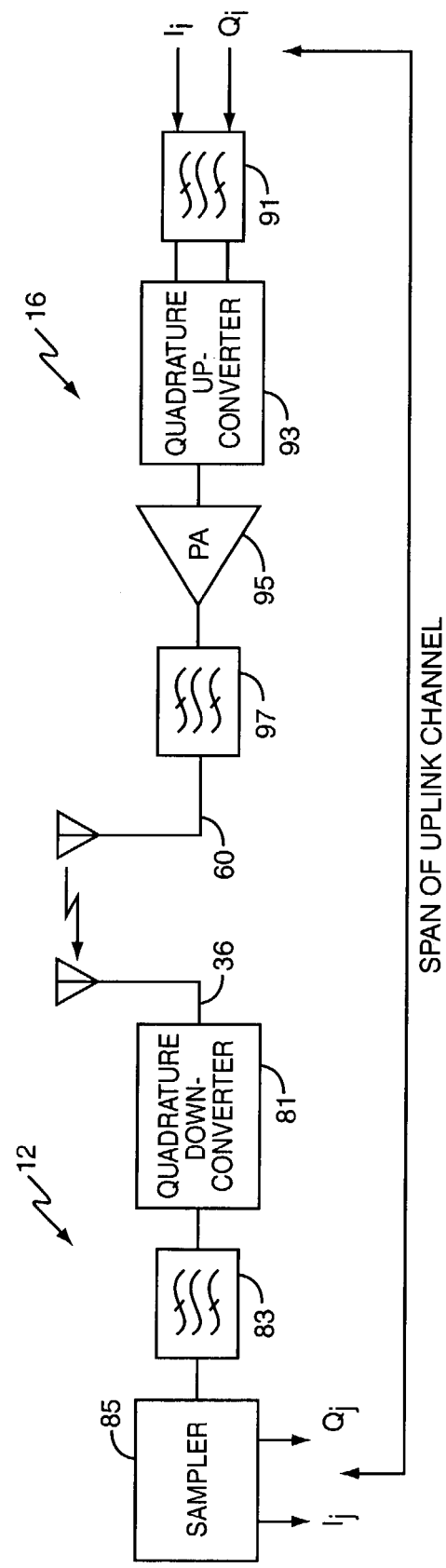
FIG. 7A
FIG. 7B

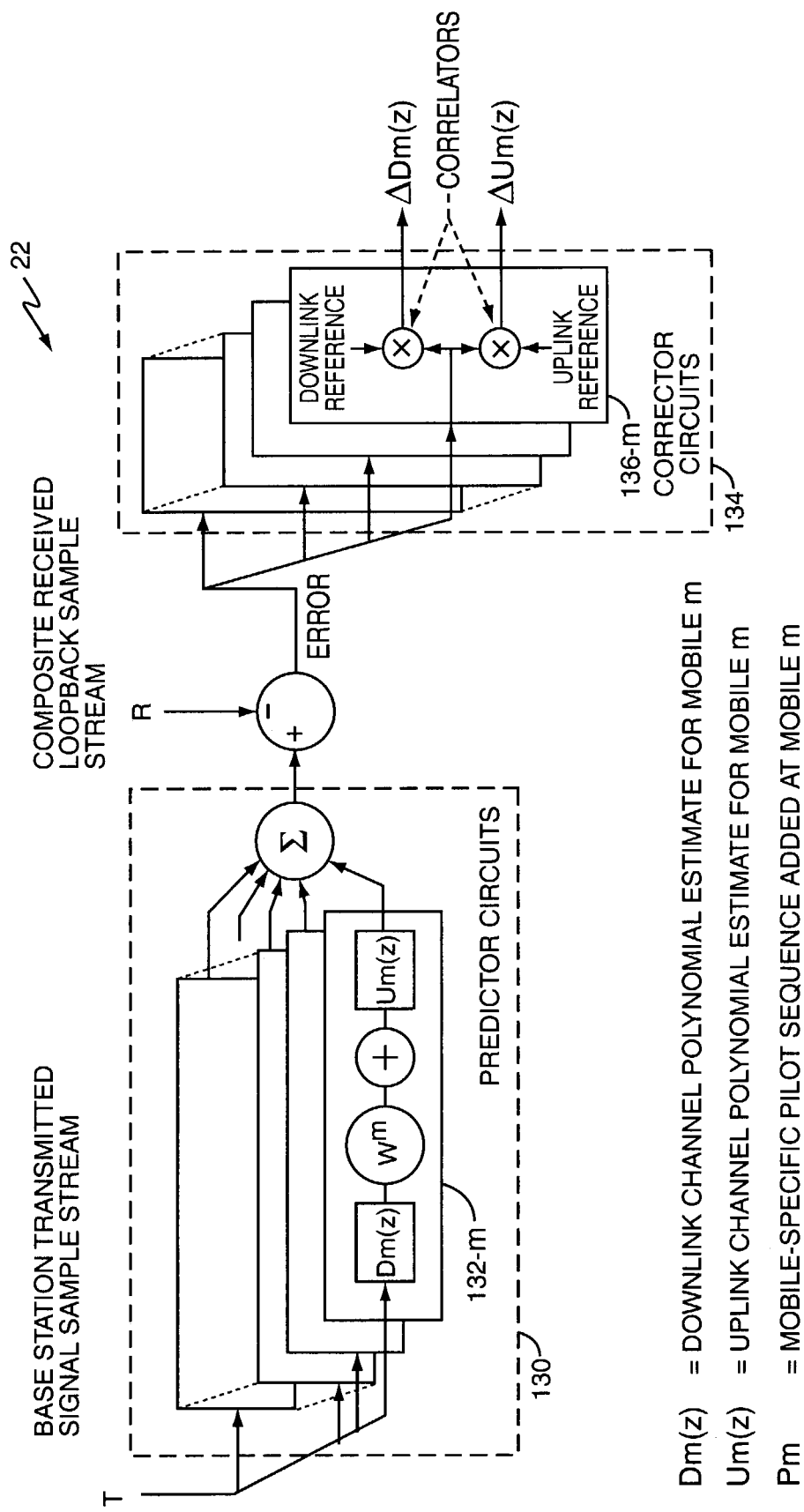

US 6,996,375 B2

TRANSMIT DIVERSITY AND SEPARATING MULTIPLE LOOPBACK SIGNALS

RELATED APPLICATIONS

This application claims priority under 35 U.S.C. § 120 as a continuation-in-part of the following co-pending U.S. applications:
- (a) Ser. No. 10/135,095, filed on Apr. 30, 2002, and entitled "Mobile Station Loop-Back Signal Processing";
- (b) Ser. No. 09/945,002, filed Aug. 31, 2001, and entitled "Interference Cancellation in a CDMA Receiving System";
- (c) Ser. No. 09/939,006, filed Aug. 24, 2001, and entitled "Communication System Employing Channel Estimation Loop-Back Signals"; and
- (d) Ser. No. 09/915,896, filed Jul. 26, 2001, and entitled "Communication System Employing Transmit Macro-Diversity"; and
- (e) Ser. No. 09/915,895, filed Jul. 26, 2001, and entitled "Communications System Employing Non-Polluting Pilot Codes".

All such applications are incorporated herein by reference.

BACKGROUND OF THE INVENTION

The present invention generally relates to wireless communications networks, and particularly relates to generating and using loop-back signal information from remote receivers, such as mobile stations in a cellular communication network.

Wireless communication typically involves translating information, such as digital data, into a characteristic modulation pattern that is applied to a transmitted carrier signal. A remote receiver obtains the transmitted information by demodulating the received carrier signal. Of course, the transmit-and-receive processes employed in modern digital communication systems involve significantly more complexity, such as the use of sophisticated channel encoding methods for combating signal fade, and error encoding methods for detecting and correcting errors in received data.

Commonly, a receiving device or system improves its reception performance by compensating the received signal for the transmit "channel," which considers signal corruption effects induced by the transmission medium, and by elements of transmitter and receiver circuits, such pulse shaping filters and signal amplifiers. Such methods base received signal compensation on one or more "channel estimates," which, in a mobile receiver, are frequently updated to reflect changing propagation path characteristics. Regardless, such channel estimates typically characterize the end-to-end phase and attenuation changes imparted to the transmitted information signal, and may be used to at least partially null or otherwise cancel such effects from the received signal at the receiving system.

An enabling element of such compensation schemes involves the transmission of information known a priori at the receiving device, such as by including a training sequence within a signal transmission that is known in advance to the receiver or by transmitting a known pilot signal in conjunction with an unknown data signal. In either case, the receiver uses the known portion(s) of the received signal(s) to determine its channel estimates. Thus, the receiver estimates the transmission channel between it and the transmitting device.

Of course, advantages may be gained by pre-compensating a transmitted signal for expected channel distortion and/or for expected interference. However, such pre-compensation requires the compensating transmitter to have foreknowledge of the current downlink reception conditions for particular remote receivers. As disclosed in one or more of the parent applications identified above, remote receivers may provide a transmitting system with loop-back signals for use by the transmitting system in estimating the downlink channels between the transmitting system and particular remote receivers. As might be guessed, more accurate channel estimates at the transmitting system enable more effective channel and interference pre-compensation.

However, the use of loop-back signals at the transmitting system, such as for transmit signal pre-compensation at one more downlink signal processing elements within the wireless network, potentially introduces significant signal processing complications. The processing complications and the effectiveness with which the loop-back signals can be used to perform desired transmit signal pre-compensation depends on the methods employed for generating loop-back signals at the particular remote receivers and on the methods used for loop-back processing at the network.

SUMMARY OF THE INVENTION

The present invention comprises a method and apparatus to transmit signals from a wireless communication network to particular remote receivers, such as to particular mobile stations within the network, which then modify the received signals in a manner unique to each receiver before loop-back transmission to the network. With knowledge of the unique modifications applied to the return signal at each receiver, and with knowledge of the signals originally transmitted by it, the network is able to separate the loop-back signals returned by the receivers. Separating the loop-back signals returned from the individual receivers enables determination of the signal propagation characteristics between the network transmitting antenna(s) and each remote receiver. Such characterization of the downlink channel(s) for each receiver enables pre-compensation of the transmit signals by the network to reduce interference at the remote receivers and/or to improve transmission power efficiency and thereby maximize received signal quality at each remote receiver.

In an exemplary embodiment, a fixed network of one or more transmitting stations transmits information using one or more transmitting antennas to a plurality of mobile stations. The mobile stations receive overlapping transmitted signals from the multiple network antennas, and each mobile station processes the received signal to obtain complex received signal samples, such as by complex down-conversion, sampling and digitization of the received signal. The mobile station then modifies the received samples in a mobile-specific manner and transmits the modified samples back to the network. One such exemplary modification comprises introducing a mobile-specific frequency shift to the returned samples.

With the frequency shifting approach, each mobile station modifies the received signal samples by applying a unique frequency shift in the form of a progressive phase rotation, the frequency shift being greater than the maximum Doppler shift caused by mobile station movement. The unique frequency shift applied by the mobile station may be modulo the sample rate and may leave the long-term power spectrum of the mobile station loop-back transmission unchanged. A frequency shifter, such as one based on complex sample multiplication, may be used by the mobile station to impart the desired phase rotation to the loop-back samples.

In another exemplary embodiment, each mobile station modifies the received signal samples by "gating" them according to mobile-specific timing such that the loop-back signals from the mobile stations are coordinated in by time-division multiplexing across the plurality of mobile stations. According to an exemplary embodiment of this approach, the network receives loop-back signal information from a particular mobile station only at particularly designated times, i.e., only in unique timeslots designated for that mobile station. Traffic signals using mobile-unique codes may be transmitted in the periods the mobile station is not transmitting the loop-back signal, and optionally also while the loop-back signal is being transmitted.

In both of the above embodiments, a pilot signal or code unique to each mobile and known to the network may be transmitted by the mobile station at any time. For example, a separate pilot signal may be transmitted continuously or intermittently by the mobile station in conjunction with its mobile-specific loop-back signal. Alternatively, the mobile station may time-multiplex pilot information and loop-back signal information together, or perform some other combination of pilot and loop-back signal information. For example, the mobile station may form a combined pilot and loop-back signal based on additive combining.

In yet another exemplary embodiment, the mobile station modifies the received signal samples by multiplying them with corresponding chips of a mobile-unique code. In an exemplary implementation of this embodiment, each mobile station uses a different code, e.g., a unique "scrambling code," and the set of codes used to generate unique loop-back signals for each of the plurality of mobile stations is orthogonal.

Regardless of the modification approach, the exemplary mobile station comprises a receiver to receive a signal transmitted by the network for use in loop-back signal generation, and obtain received signal samples therefrom, e.g., to obtain complex samples from the received signal. The exemplary receiver includes filters, amplifiers, downconverters, digitizers, and related digital processing elements as needed or desired for use in obtaining the received signal samples. Additionally, the exemplary receiver further comprises a sample processor to generate modified signal samples based on imparting a mobile-specific characteristic to them. As noted above, such modification may comprise imparting a characteristic frequency shift, imparting a characteristic scrambling code, and, among other alternatives, imparting a characteristic gating or other timing pattern to the received signal samples.

In any case, the exemplary mobile station further includes a transmitter, which may comprise baseband processing circuits, modulators, carrier frequency generators, phase-locked loops, pre-amplifiers and RF power amplifiers as needed or desired to generate a transmit signal based at least in part on the modified signal samples. Thus, the transmit signal functions as a loop-back signal received by the network that includes signal samples previously transmitted by the network but modified by the mobile station according to one or more mobile-specific values, and further modified by, i.e., corrupted by, the uplink and downlink channels between the mobile station and particular ones of the network transmitting/receiving antennas.

Uplink channel characteristics may be determined at the network based on mobile station pilot signals received at one or more network antennas, while determination of the downlink channels may be determined from the loop-back signals returned by the mobile stations. Here, the mobile-specific information facilitates processing of the composite loop-back signals, i.e., the collection of loop-back signals received at each of one or more network antennas, for determination of downlink channel propagation coefficients as between individual network antennas and individual mobile stations.

Supporting such processing, the exemplary wireless network comprises one or more network antennas and associated transceivers for transmitting signals to and receiving signals from a plurality of mobile stations. As was explained in significant detail in the parent applications, a given plurality of mobile stations may be treated as a group and interference cancellation or other transmit signal pre-compensation may be applied by collectively processing the individual information streams intended for transmission to mobile stations in that group. The present invention supports accurate determination of the downlink channels between individual network transmit antennas and individual mobile stations, i.e., the determination of downlink channel multipath propagation coefficients describing the transmission channel, which may include the effects of transmit and receive filters as well as multipath propagation effects.

Thus, in addition to the network antennas and associated transceivers, which may be referred to as transmit and/or receive stations, the exemplary network comprises a channel processor that includes one or more numerical processors or equivalent systems for performing exemplary signal processing functions. The exemplary channel processor may be included in the transmit processor named in the parent applications. Regardless, an exemplary channel processor comprises one or more predictor circuits to generate a predicted composite loop-back signal for each received composite loop-back signal based on current uplink and downlink channel estimates associated with the corresponding network antenna. Further, the channel processor comprises one or more corrector circuits to update the associated uplink and downlink channel estimates relating each network antenna to each mobile station based on prediction errors determined from the predicted and received composite loop-back signals. Exemplary corrector circuits include channel trackers that maintain a tracking loop for updating the collections of individual channel propagation coefficients that estimate the uplink and downlink channels between individual network antennas and individual mobile stations.

Those skilled in the art will appreciate that the present invention may be implemented and practiced in a variety of ways, and will therefore understand that the following details are exemplary rather than limiting. Additional features and advantages of the present invention will be apparent upon reading the following detailed description as supported by the accompanying figures.

BRIEF DESCRIPTION OF THE DRAWINGS

FIGS. 7A and 7B are diagrams of exemplary uplink and downlink channel spans.

FIG. 13 is a diagram of exemplary predictor and corrector circuits in a loop-back signal processor/channel processor that support loop-back signal processing and channel estimation in the network.

DETAILED DESCRIPTION OF THE INVENTION

The present invention has broad applicability to various types of wireless communication networks, and is subject to changes regarding its implementation as needed or desired for a particular type or configuration of wireless communication network. Thus, while one or more embodiments may have particular applicability to wireless networks based on Code Division Multiple Access (CDMA) standards, such as IS-95B, IS-2000 (cdma2000), or Wideband CDMA (WCDMA) standards, it should be understood that one or more other embodiments have applicability to networks employing Time Division Multiple Access (TDMA) techniques, such as IS-136 or GSM-based networks. Of course, it should be understood that one or more embodiments of the present invention, or particular elements or sub-systems thereof, might have applicability to both CDMA and TDMA networks.

Figure 1:
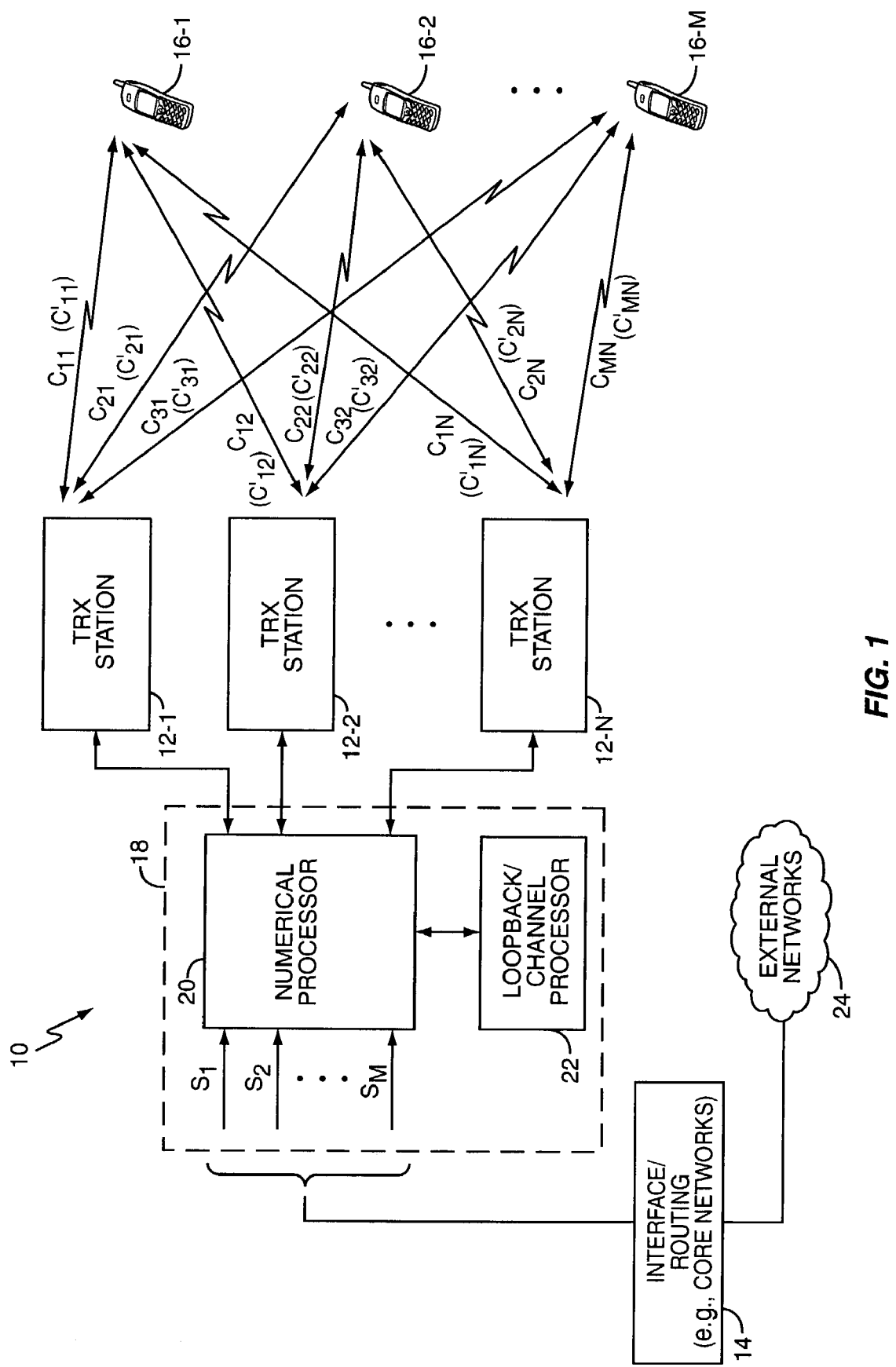
FIG. 1 is a diagram of an exemplary wireless communication network.

With that broad scope in mind, the discussion turns to FIG. 1, which illustrates an exemplary wireless communication network 10. It should be understood that the illustration is a simplified diagram that omits certain network elements not necessary to understanding the present invention. Indeed, even where a given entity is illustrated, such illustration may be simplified to the extent that omitted details are not germane to understanding the present invention. Thus, those skilled in the art will immediately appreciate that network 10 as actually implemented may have additional complexity.

In FIG. 1, network 10 comprises one or more transceiver stations 12 (shown as 12-1, 12-2, ..., 12-N), which are at least indirectly coupled to one or more interface/routing entities 14 via transmit processor 18, and which support wireless communication with one or more mobile stations 16 (shown as 16-1, 16-2, ..., 16-M). The interface/routing entities 14 are themselves coupled directly or indirectly to one or more external networks 24, such as the Public Switched Telephone Network (PSTN), and Public Data Networks (PDNs) such as the Internet. To that end, exemplary interface/routing entities might include Mobile Switching Centers (MSC) and other Circuit-Switched Core Network (CSCN) entities as needed, and/or Packet Data Serving Nodes (PDSNs) and other Packet Switched Core Network (PSCN) entities as needed.

One or more of the parent applications provide exemplary details for transmit processor 18 as regards the use of the included numeric processor 20 in transmit signal pre-compensation operations. Indeed, other figures herein provide at least some exemplary details, but it should be understood that transmit pre-processing may be implemented in a variety of different ways, and that the loop-back signal details of the present invention are not dependent on the details of transmit pre-processing operations. Rather, the present invention is properly viewed as an enabling element for transmit pre-processing as it supports the accurate and efficient generation of downlink channel estimates that underlie transmit pre-processing operations. Thus, the focus of this disclosure properly is on the loop-back/channel processor 22, that is included in the transmit processor 18 in an exemplary embodiment.

Thus, as explained in detail in one or more of the previously noted and incorporated parent applications, each transceiver station 12 includes one or more network transmit antennas transmitting signals to some or all of the mobile stations 16-1 through 16-M. Similarly, signals transmitted from each mobile station 16 are received at some or all of the transceiver stations 12. Thus, in a nominal case, each mobile station 16 receives a composite signal comprising combined signals from some or all transceiver stations 12, and each transceiver station 12 receivers a composite signal comprising combined signals from some or all of the mobile stations 16-1 through 16-M. Note that transceiver stations 12 as illustrated include network antennas for wirelessly transmitting to and receiving from mobile stations 16, but one or more embodiments of the present invention contemplates implementation of separate transmit and receive stations that may or may not use co-located receiving/transmit antennas.

In any case, downlink and uplink channels nominally exists between each transceiver station 12 and each mobile station 16. The downlink channel from transceiver station 12-1 to mobile station 16-1 is denoted as C11, while the uplink channel for the same pair is denoted as C'11, where the first digit indicates the mobile station number (i.e., mobile station 1, 2, 3, ...) and the second digit represents the network antenna number (i.e., transceiver station 1, 2, 3, ...). Thus, the downlink channel from network antenna 2 to mobile station 3 would be designated as C32. Here, C32 may be represented as a complex polynomial characterizing the multipath propagation between the corresponding network antenna and mobile station.

As thoroughly detailed in the parent applications, network 10 may use knowledge of the downlink channels to pre-compensate its transmissions to the mobile stations 16 for reducing interference at the mobile stations 16, for increasing transmit power efficiency, or for some advantageous combination thereof. However, unlike the uplink channels, which may be estimated directly from pilot signal or other known information received at network 10 from the mobile stations 16, the downlink channels pose a more complicated estimation problem. As taught by the parent applications, downlink channel estimates may be obtained from loop-back signal information transmitted to network 10 by the mobile stations 16. However, the network's ability to obtain meaningful information for downlink channel estimation without undue processing complexity depends on favorable formulation and processing of such loop-back signals.

To that end, the present invention provides novel loop-back signal generation and processing wherein each mobile station 16 generates a mobile-specific loop-back signal that enables efficient processing of the composite loop-back signals received by network 10 for separation of per-mobile loop-back signal information and downlink channel estimation therefrom. In general support of this exemplary processing, the network 10 transmits known signals from its one or more transceiver stations, which signals are received and processed by the mobile stations 16 for generation of mobile-specific loop-back signals that are transmitted back to the network 10 for use in downlink channel estimation.

Figure 2:
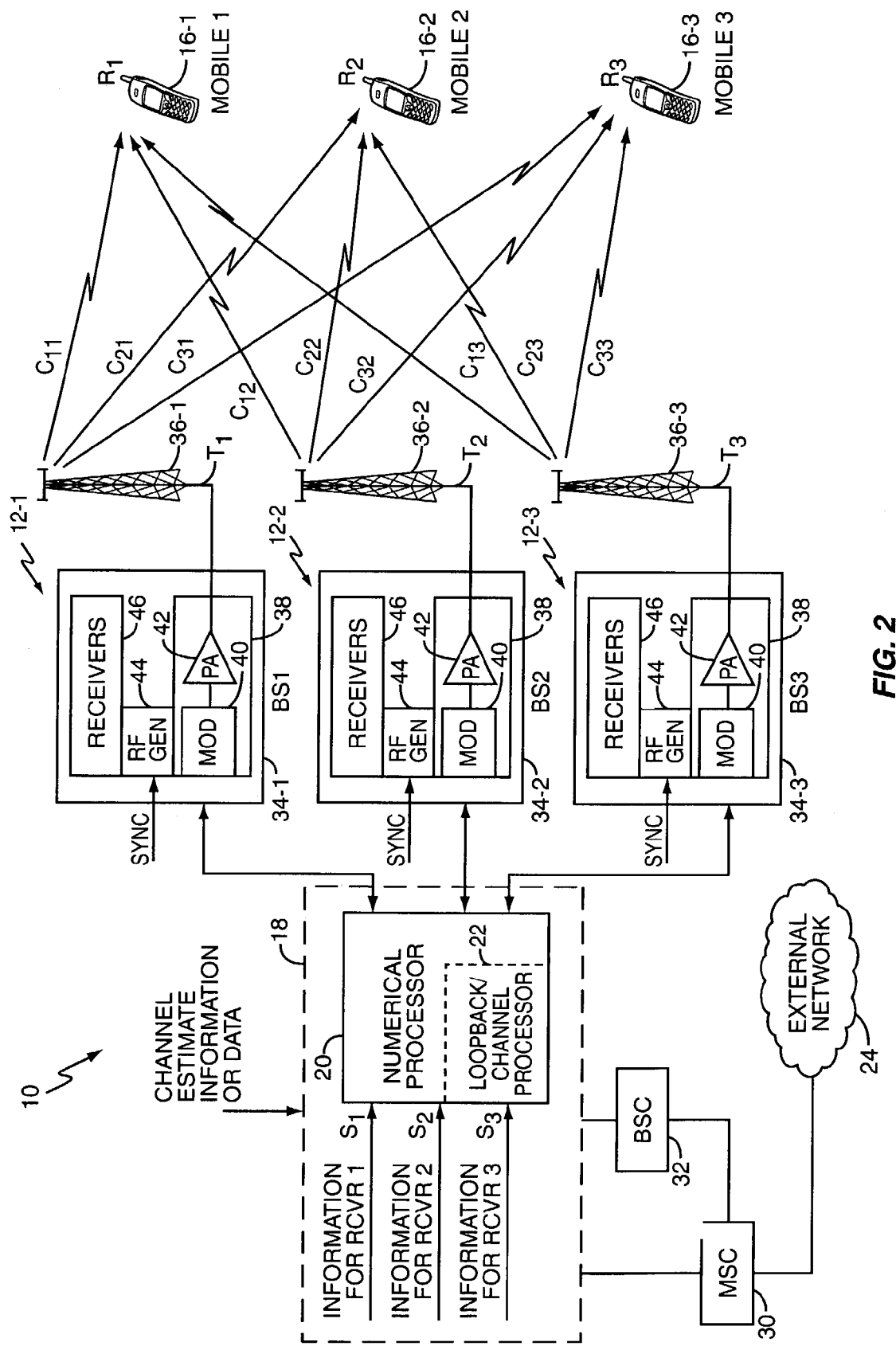
FIG. 2 is a diagram of exemplary details for the network of FIG. 1.

FIG. 2 illustrates a more detailed exemplary network 10, wherein the interface/routing entities 14 comprise a MSC 30 and an associated Base Station Controller 32, and wherein the transceiver stations 12 comprise base stations 34 and associated transmit/receive antennas 36. An exemplary base station 34 comprises transmitter resources 38, including modulators 40 and power amplifiers (PAs) 42, RF generating circuits 44, and receiver resources 46.

FIG. 2 is thus representative of an exemplary communication network 10 disclosed in one or more of the parent applications for transmitting downlink signals using multiple network antennas (36-1, 36-2, . . . ) to multiple remote stations (mobile stations 16-1, 16-2, . . . ) in which the signals transmitted are preconditioned by transmit processor 18 based on knowledge of the downlink propagation paths. Such operation is, as noted above, enhanced by the loop-back signal generation and processing of the present invention, which provide improved processing methods that enable network 10 to acquire and maintain the needed downlink propagation path characteristics.

Figure 3:
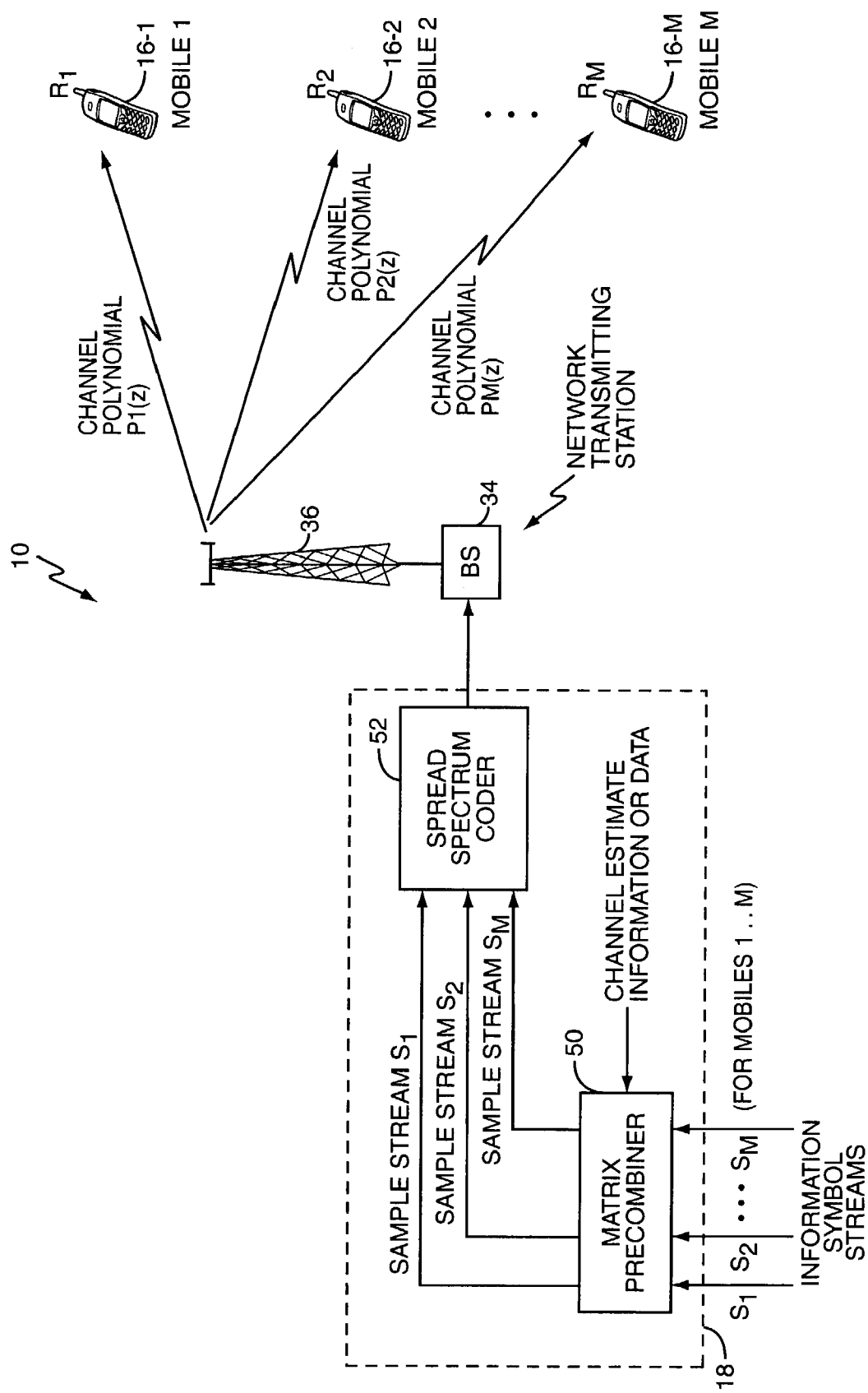
FIG. 3 is a diagram of alternate exemplary details for the network of FIG. 1.

FIG. 3 illustrates an application of the present invention wherein one network antenna 36 supports a plurality of mobile stations 16 based on a CDMA implementation of network 10. With this configuration, transmit processor 18 includes a matrix precombiner 50 that pre-processes symbol streams for transmission to the mobile stations 16 based on symbol-rate processing only, using knowledge of the CDMA spreading codes used in coder 52 and on the estimated downlink channel characteristics, to minimize interference between signals destined for different mobile stations 16.

Figure 4:
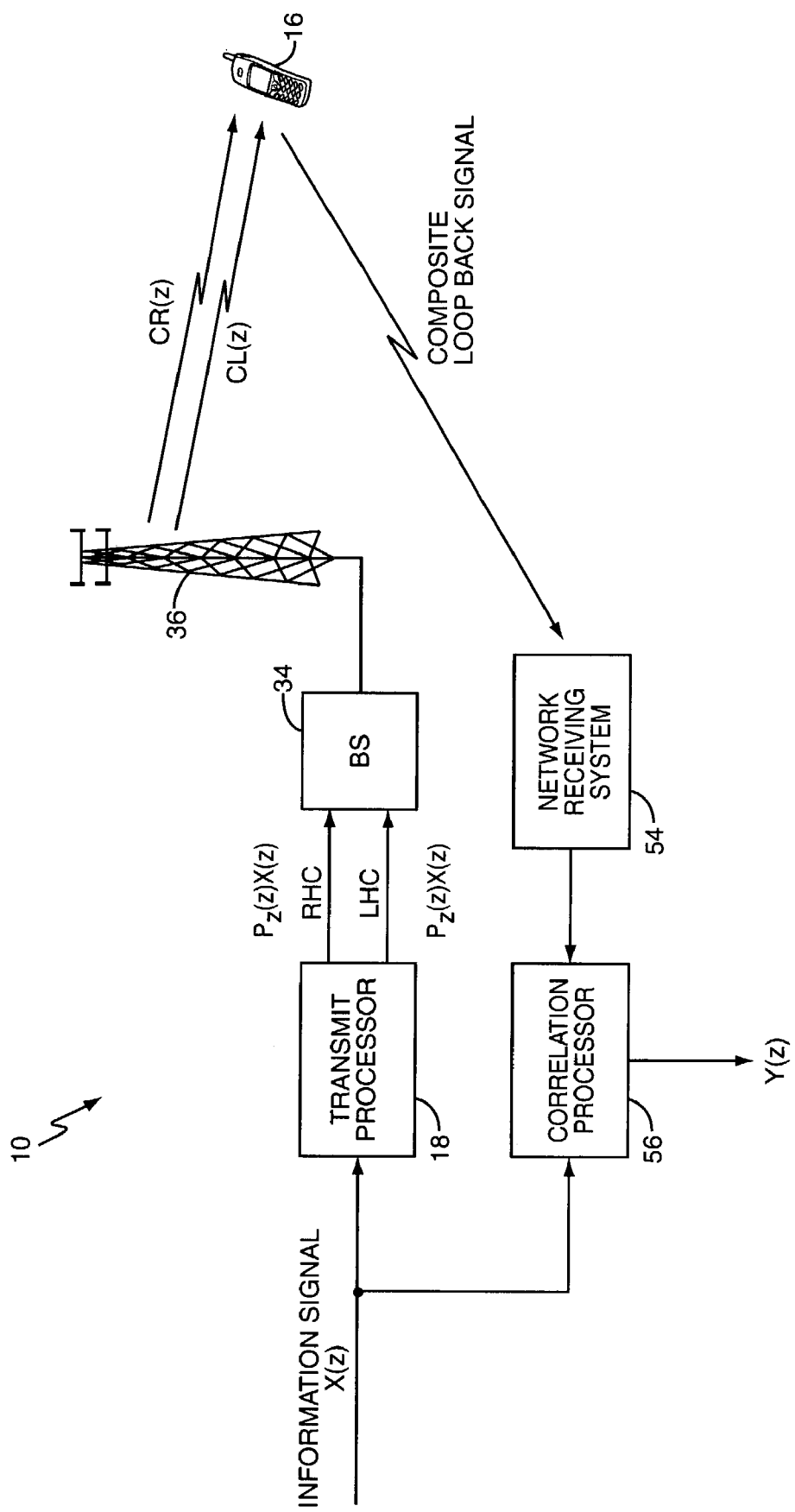
FIG. 4 is a diagram of alternate exemplary details for the network of FIG. 1.

FIG. 4 illustrates yet another application supported by the present invention, in which two network antennas are collocated at the same site and can, for example, just be a dual-polarized antenna element on network antenna 36. With that configuration, information is preconditioned for transmission by the two antennas using chip rate processing to independently optimize transmissions from the network 10 to each mobile station 16 independently. The systems of FIGS. 3 and 4 both require downlink channel information to optimize their transmissions to the individual mobile stations 16. Further, FIG. 4 illustrates a potential information deficiency problem that arises in determining estimates for two downlink channels from only one loop-back signal. However, one or more of the parent applications provided exemplary solutions for solving such deficiency problems. See, e.g., the previously identified application entitled "Non-Polluting Pilot Codes," in which it solves the deficiency problem by transmitting at least one "dummy" pilot signal from the network 10, as well as transmitting information bearing signals.

Figure 5:
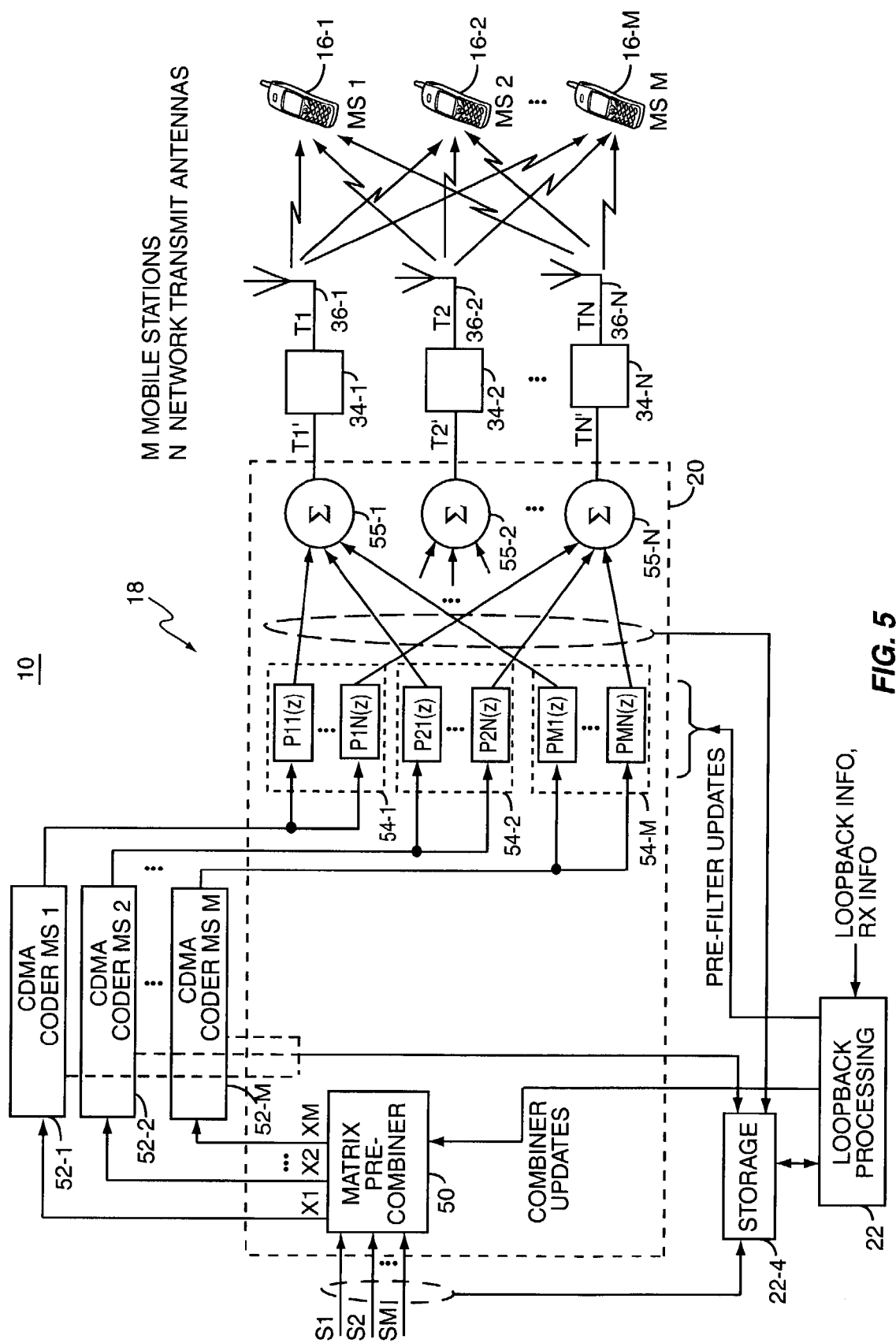
FIG. 5 is a diagram of exemplary transmit signal pre-compensation.

FIG. 5 essentially illustrates a combination of the network embodiments illustrated in FIGS. 3 and 4, in which transmission is optimized both by chip rate processing to optimize efficiency given multiple network transmit antennas and by symbol rate processing to pre-cancel interference between information symbols intended for different ones of the mobile stations 16.

The parent application entitled "Mobile Station Loopback Signal Processing" disclosed two different loop-back methods intended respectively for optimizing transmit preconditioning at the chip-rate level and for optimizing transmit preconditioning at the symbol-rate level. For optimizing at the chip-rate level, network 10 must have current knowledge of the involved downlink channels, which knowledge may be provided, for example, by looping back the mobile station's raw (unprocessed) received signal samples obtained from a network-transmitted signal.

For optimizing at the information symbol rate, a mobile station 16 can alternatively loop-back its RAKE receiver soft symbol output values, i.e. it can loop-back partially processed signal values obtained from a received network-transmitted signal. In such cases, the mobile station 16 may re-spread the soft symbol values using a mobile-unique code that enables the network 10 to separate the loop-back signals it receives from different mobile stations 16.

With regard to the first method above, for non-CDMA transmission protocols (or very low CDMA spreading factors), the separation of a small number of overlapping mobile station loop-back signals may be achieved by having an equal number of small network antennas. Such an arrangement would obviate the need for applying mobile-specific information to each loop-back signal otherwise needed for loop-back signal separation at the network 10. In a CDMA transmission protocol however, the number of overlapping mobile station loop-back signals can greatly exceed the number of network antennas. If each loop-back signal is a function of only one network-transmitted signal per network antenna, then the sum of the loop-back signals received back at the network 10 is also a function only of that number of independent signals, and cannot then be separated into a greater number of mobile station loop-back signals in a unique fashion.

Mindful of such limitations and complications, the present invention contemplates a loop-back signal generation and processing method and apparatus that provides efficient loop-back signal processing. Moreover, one or more embodiments of the present invention provide exemplary loop-back signal generation and processing wherein the processing increases in complexity only in proportion to the number of involved mobile stations 16.

Figure 6:
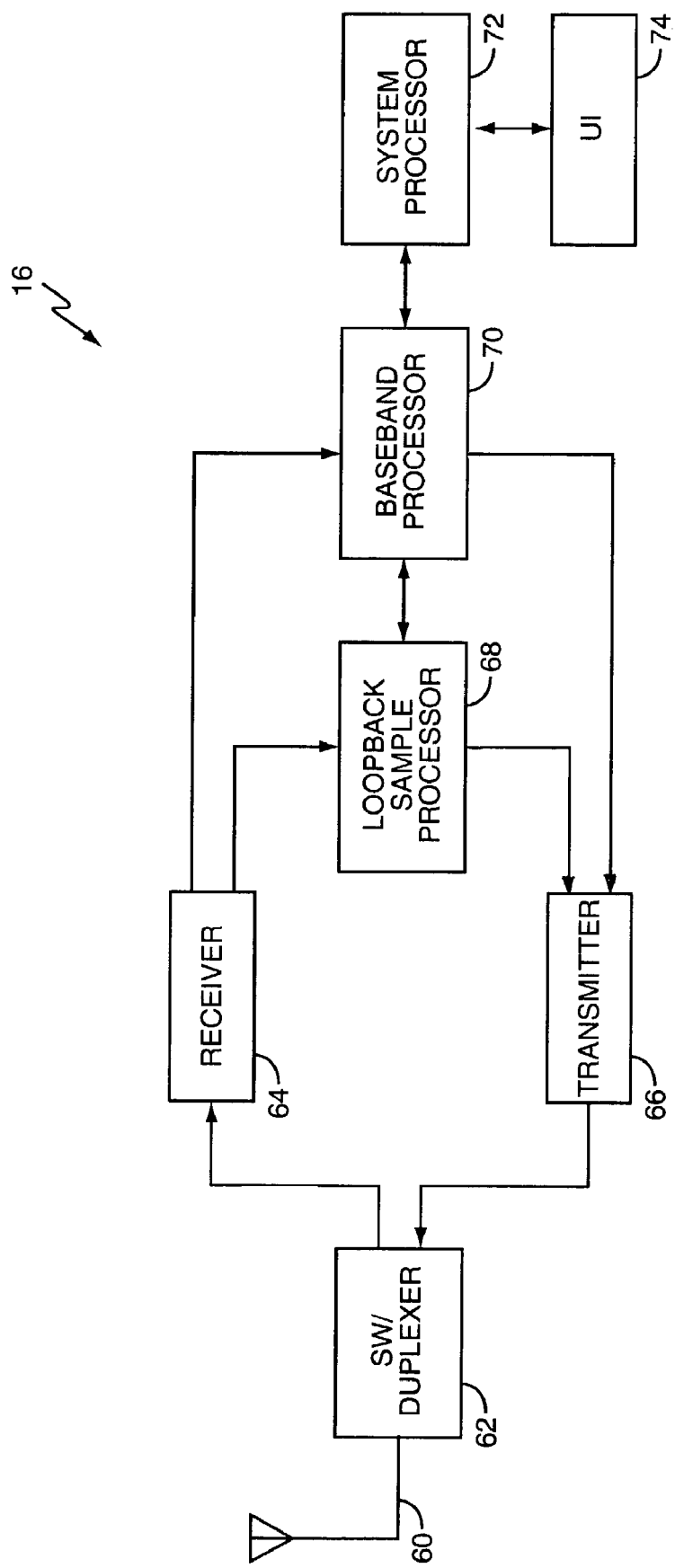
FIG. 6 is a diagram of an exemplary mobile station for generating mobile-specific loop-back signals.

In pursuit of these and other aims, FIG. 6 illustrates an exemplary mobile station 16 for generating a mobile-specific loop-back signal in support of downlink channel estimation by network 10. Mobile station 16 comprises an antenna assembly (antenna) 60, a switch/duplexer 62, a receiver 64, a transmitter 66, a loop-back sample processor 68, a baseband processor 70, a system processor 72, and a user interface (UI) 74. Those skilled in the art will appreciate that implementation of mobile station 16 is subject to variation. For example, portions of the receiver 64 and transmitter 66 may be included in the baseband processor 70, which itself may comprise one or more Digital Signal Processors (DSPs) and/or other programmable logic devices, such as Field Programmable Gate Arrays (FPGAs) or Application Specific Integrated Circuits (ASICs).

Indeed, baseband processor 70 may comprise one or more digital processing circuits that, together, perform selected receive operations, such as equalization or RAKE combining for receiver 64, and selected transmit operations, such as digital encoding and modulation. Regardless, with the flexible nature of the digital processing resources included within the exemplary mobile station 16, it should be understood that sample processor 68 depicts an exemplary functional block that may be implemented as a hardware function, a software function, or some combination thereof, and may be integrated with the baseband processor 70.

In an exemplary operation, the network 10 transmits a signal from each of one or more network antennas, such that a particular mobile station 16 receives a combination of such signals as a received signal. Receiver 64 processes that received signal, such as by filtering, amplifying, downconverting, and sampling to provide sample processor 68 with received signal samples to be used in loop-back signal generation. Sample processor 68 applies some mobile-specific modification to these received signal samples, which are then processed for transmission back to the network 10 in a loop-back signal transmitted by mobile station 16. Such processing may involve encoding of the modified signal samples by baseband processor 70, possibly together with pilot and/or uplink traffic information, and subsequent modulation onto a RF carrier signal by transmitter 66.

FIG. 7A illustrates an exemplary downlink channel "span" as between a particular network antenna 36 and a particular mobile station 16. Thus, the exemplary downlink channel to be estimated includes the effects of selected elements in the transmit and receive signal paths at the involved network transmit station 12 and at the mobile station 16, as well as the more obvious effects of multipath over-the-air signal propagation associated with actual transmission to the mobile station 16.

Thus, the exemplary downlink channel span is defined as being from the sample inputs of transmitter filter 80 in transceiver station 12 to the sample outputs of sampler 90 in the receiver circuits of mobile station 16. Similarly, the exemplary uplink channel is defined as an "end-to-end" channel that includes the mobile station's transmit circuit path, the over-the-air propagation paths, and the transceiver station's receive circuit path. Thus, the exemplary uplink channel spans from the sample inputs of filter 91 in mobile station 16, to the sample outputs of receive signal sampler 85 in transceiver station 12. Of course, it should be understood that other channel definitions may be used as needed or desired.

With the above definitions, the "loop" channel represents the round-trip channel definition from network-to-mobile-back-to-network. As such, the loop channel is the product of the downlink and uplink channels defined above.

Figure 8:
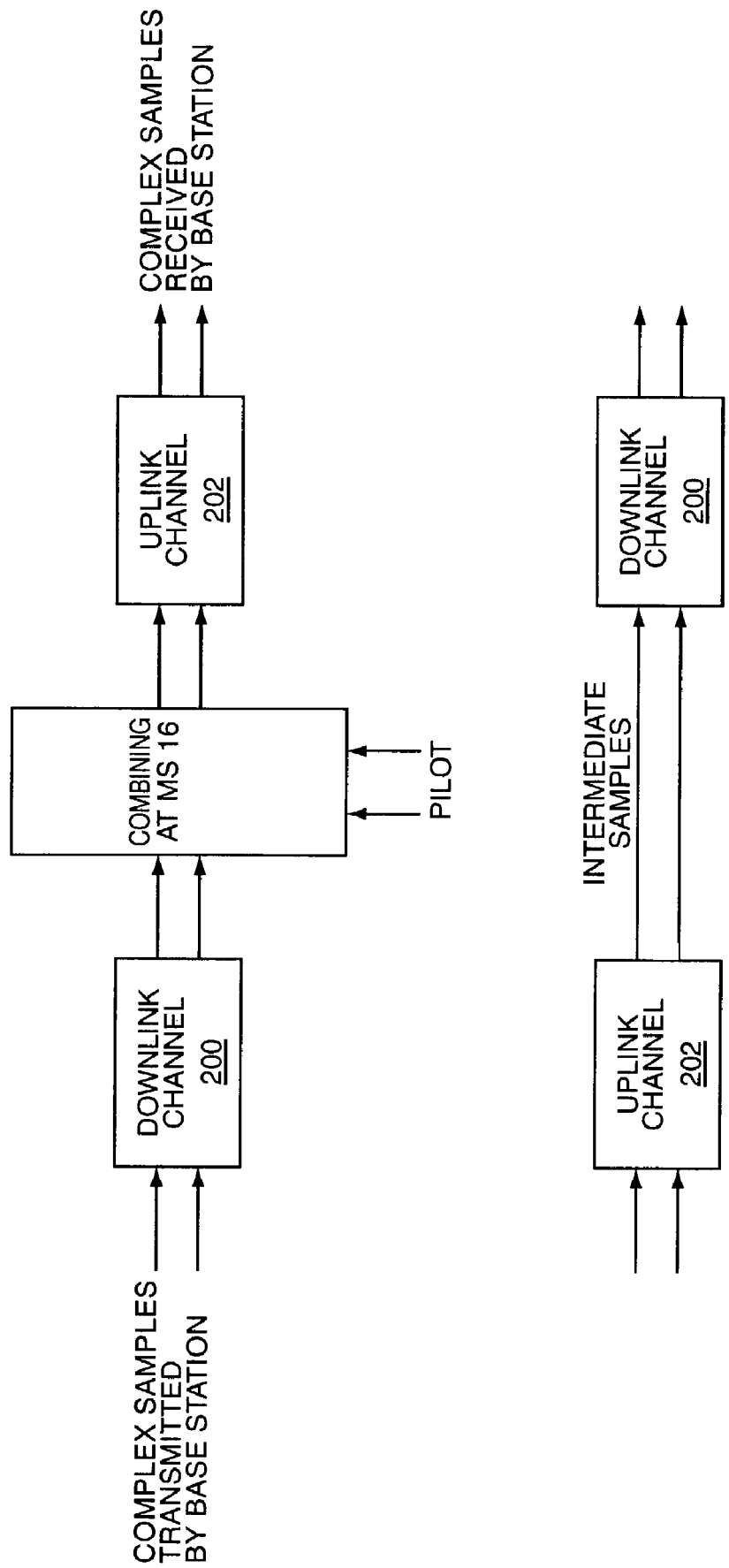
FIG. 8 is a diagram of signal flows for actual downlink/uplink channel ordering and constructive downlink/uplink channel ordering that may be used to facilitate loop-back signal processing at the network.

FIG. 8 illustrates that the loop channel is unchanged by imagining a reversed ordering of the uplink and downlink channels. In that reversed case, the intermediate samples arising between the reversed uplink and downlink channels do not correspond with samples that arise with the actual channel ordering. However, these imagined intermediate samples may be calculated at network 10 by its passing known downlink samples through a model of the uplink channel as determined by network 10 from the pilot codes added to or sent in conjunction with the mobile station's loop-back signal, i.e., as if the samples had been input to transmit filter 91 of mobile 16.

Since the intermediate samples serve as inputs to the downlink channel model maintained at network 10, the output represents an estimated loop-back signal, which may be processed with the actual loop-back signal to determine modeling errors, i.e., channel estimation errors. However, difficulties may arise when the loop-back signal(s) being processed by the network are composite loop-back signals representing the summation of many individual loop-back signals received from different mobile stations 16. For example, if the individual loop-back signals are each a function only of the same originally transmitted signals, it is only possible to determine a combination for the downlink channels and not possible to separate that information into particular downlink channel estimates for each mobile station 16.

Figure 9:
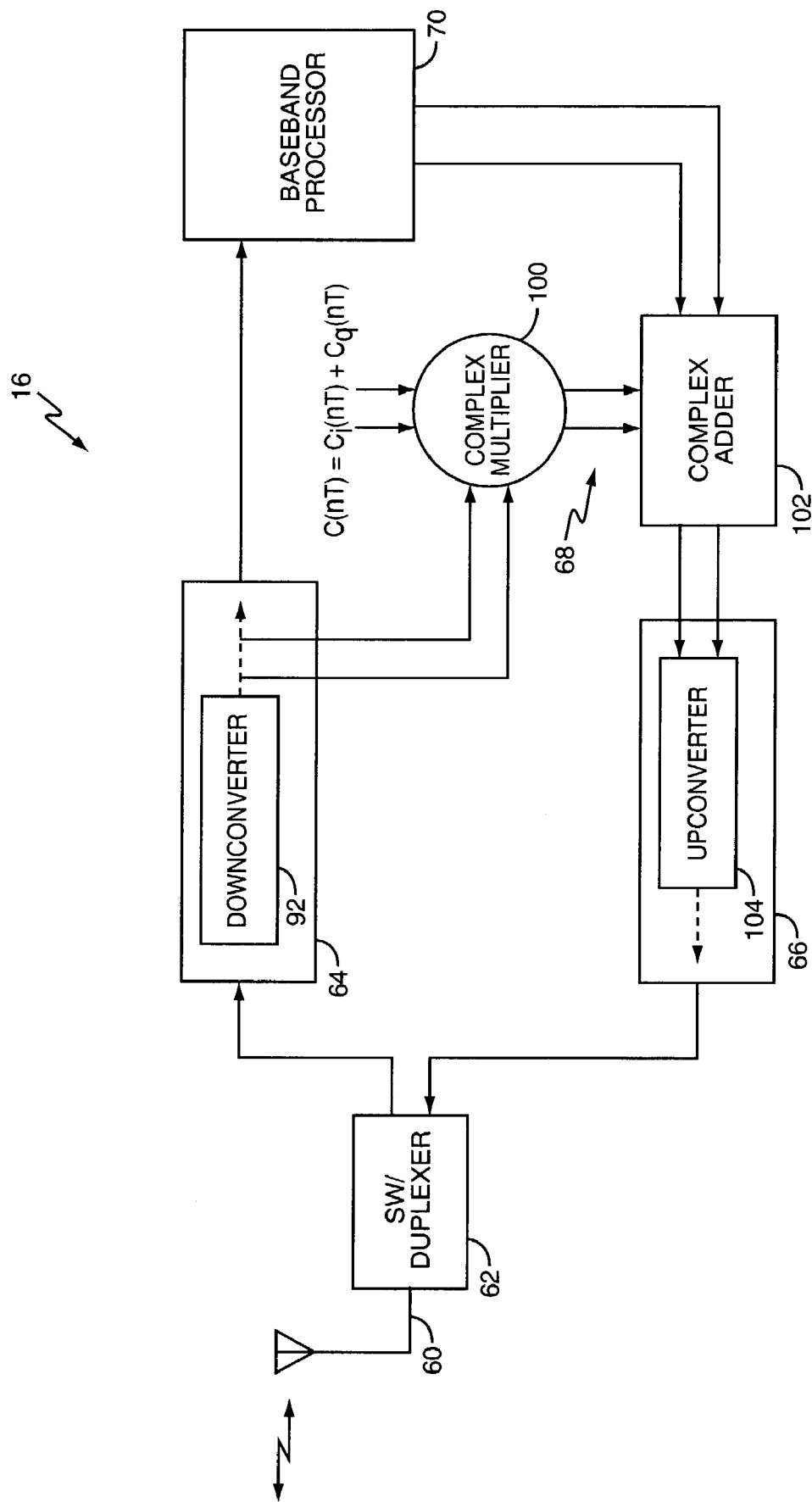
FIG. 9 is a diagram of exemplary mobile station details supporting loop-back signal generation.

In addressing such concerns, FIG. 9 illustrates an exemplary embodiment of mobile station 16 in which the sample processor 68 generates mobile-specific sample values by applying a mobile specific code to samples obtained from a network-transmitted signal. As such, the exemplary sample processor comprises a complex multiplier 100 and a complex adder 102. Again, it should be noted that these functional representations may be realized as part of baseband processor 70 and/or other digital processing circuits available in mobile station 16 rather than as separate processing elements.

The mobile-unique codes can be selected from a set of orthogonal codes of finite length, which are repeated, such as complex-scrambled Walsh codes. The mobile station 16 receives a mix of base station transmissions at antenna 60, which is coupled to downconverter 92 of receiver 64 through switch/duplexer 62. If simultaneous receive/transmit capability is desired, then element 62 includes duplex filter arrangements to maintain receive/transmit signal isolation. For half-duplex operation, as is common with contemporary digital communication standards, element 62 may comprise a selective receive/transmit switch.

Regardless, the network-transmitted signal is received at antenna 60 and passes to receiver 64, where an exemplary received signal is converted into a stream of complex samples at a rate of one complex sample per chip. The complex samples, having an I- or real part and a Q- or imaginary part are combined with a mobile-specific code sequence $C(nT)$ which can be a complex code sequence comprising a real code sequence $C_i(nT)$ and an imaginary code sequence $C_q(nT)$, and the combining can, for example, be complex multiplication using multiplier 100. In addition, a mobile-specific uplink pilot and optionally uplink traffic can be combined in complex adder 102 with the modified loop-back signal samples for transmission to the network 10. Such combination may be obtained by linearly adding the complex pilot/traffic sequence to the modified signal samples in adder 102.

Combination with traffic/pilot can alternatively take place before multiplier 405 so that the traffic/pilot signal is also multiplied with the mobile-specific code $C(nT)$. The combined loop-back, pilot and uplink traffic signal samples would then be applied to an upconverter 104 in transmitter 66, which can comprise low-pass filtering to turn the sample stream into a continuous-time waveform and a quadrature modulator to impress the signal on an uplink carrier signal for transmission. The exemplary transmitter 66 further includes a power amplifier (PA), such as a linear PA, for amplifying the carrier signal for transmission to network 10 via antenna 60.

While the above-described mobile-specific code method allows separation by network 10 of loop-back signals from different mobile stations 16, it unfortunately renders invalid the interchange of uplink and downlink channels illustrated in FIG. 8. As such, determination by network 10 of the downlink channels to particular mobile stations 16, even with perfect knowledge of the uplink channels, is at least somewhat complicated.

Thus, a more preferred exemplary method for generating mobile-unique modifications in loop-back signal generation is one which does not invalidate the interchange of uplink and downlink channels illustrated in FIG. 8. One such method is time-division multiplexing, in which each mobile station 16 transmits its loop-back signal in an allocated timeslot, and blanks loop-back transmission in other timeslots. In other words, each mobile station 16 transmits a gated loop-back signal according to mobile-specific timing. In an exemplary embodiment, the allocated timeslots are arranged to recur with a frequency adequate to track the time-varying downlink channels. In certain circumstances, this limitation may involve restricting the benefits of loop-back based pre-compensation to mobile stations 16 whose rate of movement is below some practical upper limit.

Figure 10:
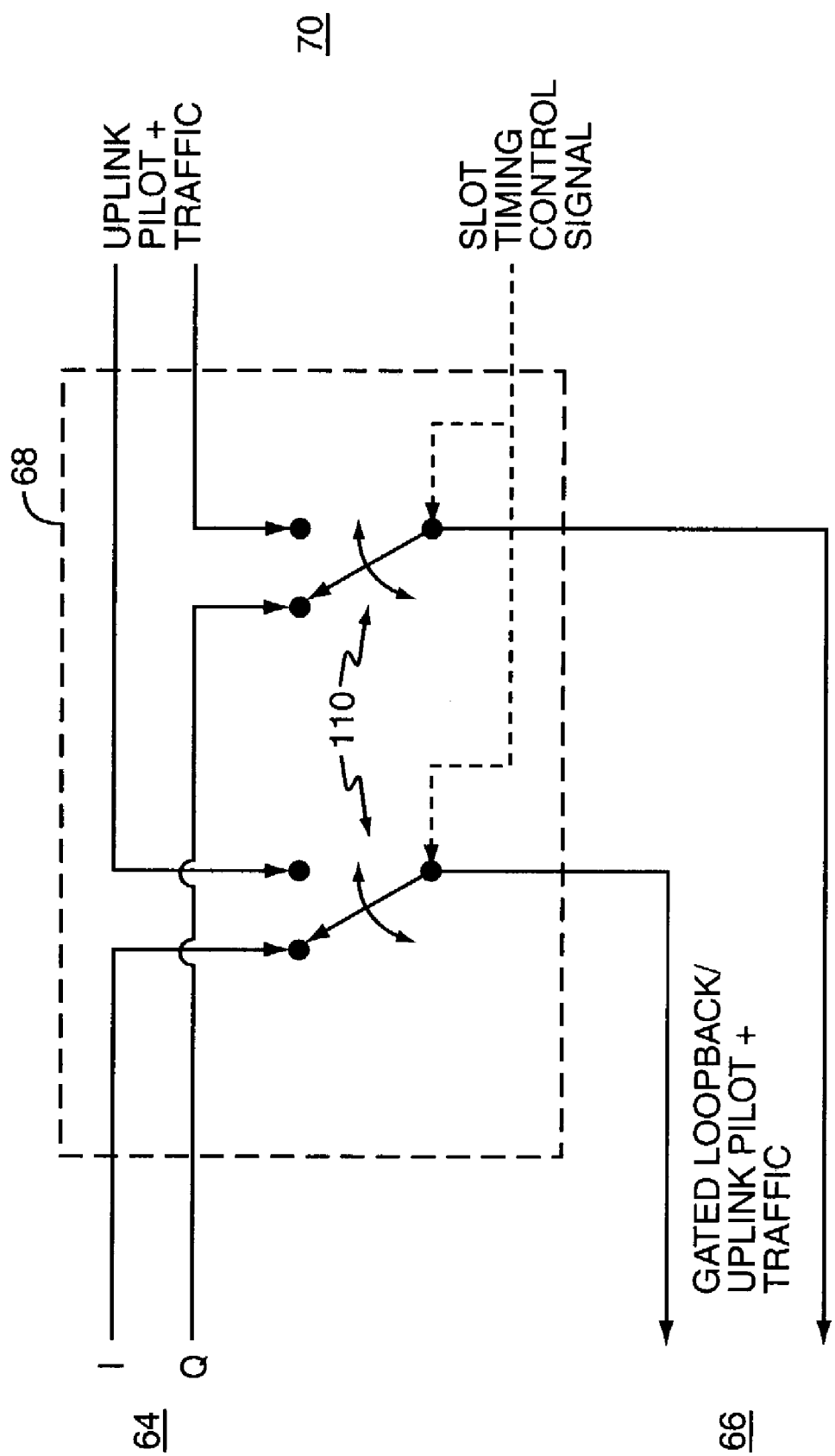
FIG. 10 is a diagram of alternate exemplary mobile station details supporting loop-back signal generation.

FIG. 10 illustrates an exemplary sample processor 68 in mobile station 16 for implementing time-division multiplexing of loop-back signals. Mobile station receive and transmit operations are essentially as described above, but the received signal samples obtained from the network-transmitted signal are now modified by applying a mobile-specific gating operation to them. In one embodiment, sample processor 68 gates the loop-back return of the received signal samples by enabling their return transmission only in mobile-specific timeslots. Selector 110 thus selects the loop-back signal samples to be applied to transmitter 66 only when controlled to do so by a slot timing control signal.

Here, it should be noted that in one or more exemplary embodiments, network 10 determines or otherwise assigns one or more mobile-specific parameters to each mobile station 16 in a particular group of mobile stations 16. Such "generating values" may be transmitted to an individual mobile station during call setup, or using other available channels, such as common control or paging channels used for transmission of control signaling from network 10 to mobile stations 16. Thus, network 10 may "define" a plurality of mobile stations 16 based on, for example, which transceiver stations 12 are (or will be) used to serve them, and then assign mobile-specific generating values to individual mobile stations 16 as needed.

Slot-timing information is representative of such a generating value, and thus network 10 might transmit slot timing information to each mobile station 16, such that each mobile station 16 gates its loop-back signal according to mobile-specific timing. It should be noted that pilot and/or uplink traffic may be transmitted by a mobile station 16 during the periods when it is not looping back network-transmitted signal samples from sample processor 68.

Such a gating selection process can also be equated to using a code C(nT) in FIG. 9 that is zero when T is not within the mobile station's allocated loop-back timeslot and non-zero only in the allocated loop-back slot(s). Selector 110 may, as shown, select uplink traffic and/or pilot signals to be transmitted at other times. Alternatively, uplink traffic+pilot signals can be transmitted continuously and the loop-back signal selected to be combined with the uplink traffic+pilot information only in the allocated loop-back slots.

As the network 10 would receive only one mobile station's loop-back signal during any given timeslot, there would be no overlap of loop-back signal information returned from a plurality of mobile stations 16. As such, the timeslot method avoids the challenges arising from loop-back signal separation processing at the network 10. However, disadvantages might arise where a large number of mobile stations 16 are required to transmit loop-back signals. The frequency of loop-back slots allocated to one mobile station 16 may become inadequate to permit effective tracking of channel changes by network 10. Remedies for this overload condition while still employing time-division loop-back methods may include any or all of the following:

allow M mobiles to use the same slot, where M is the number of loopback signals the network can separate using multiple antenna processing;

allocate slots more frequently to fast moving mobiles and less frequently to slowly moving mobiles; or turn off loop-back transmissions from mobile stations 16 that have had an inactive downlink for more than a certain time-out period.

With the above remedies, obvious advantages accrue from an initial allocation or set-up of the loop-back regime to be used by each mobile station 16. Such operations may cause inefficiency if mobile stations 16 are operating very intermittently, as with mobile web browsing, which is characterized by periods of high activity interspersed with idle periods. Other exemplary methods of mobile-specific loop-back generation may overcome such potential disadvantages.

Figure 11:
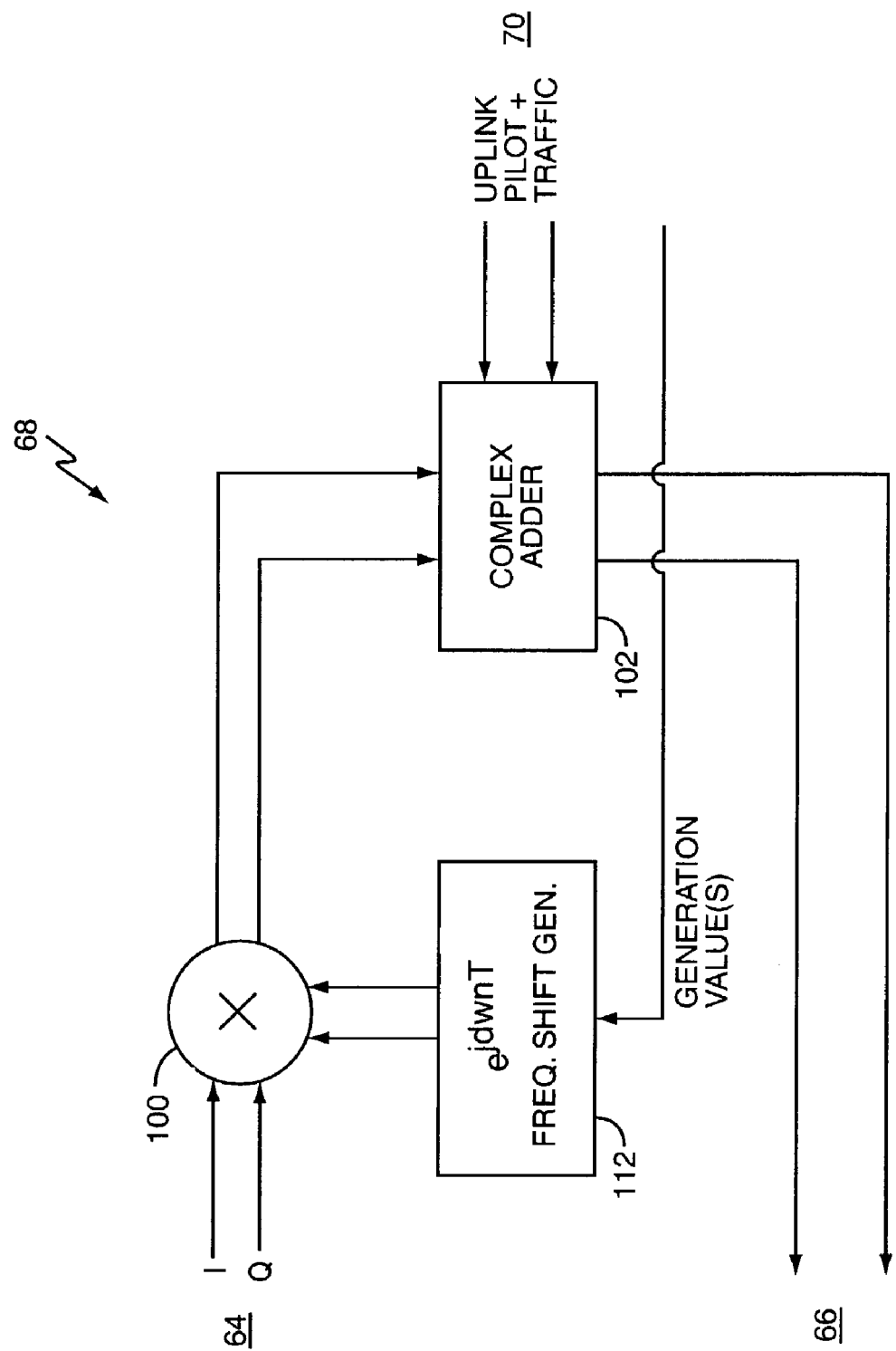
FIG. 11 is a diagram of additional alternate exemplary mobile station details supporting loop-back signal generation.

For example, FIG. 11 illustrates an exemplary sample processor 68 in mobile station 16 that generates a mobile-specific loop-back signal by applying a mobile-specific frequency shift to received signal samples. While similar to the mobile-specific sample coding of FIG. 9, the sample processor 68 in this embodiment applies a mobile-specific frequency shifting sequence to received signal samples. More particularly, a shift generator 112 imparts a frequency shifting sequence to received samples based on one or more mobile-specific generating values that uniquely define the shifting sequence applied by the mobile station. It should be understood that the term "unique sequence" broadly includes different mobile stations 16 using the same sequence or sequence pattern but at different offsets, etc.

An exemplary frequency shifting sequence produced by frequency shift generator 112 is a sequence of complex numbers of constant amplitude and progressively increasing phase. Such a sequence is described for successive instants nT by $e^{jdwnT}=\cos(dwnT)+j\sin(dwnT)$. When the frequency shift dw is a multiple of $2\pi/MT$, the sequence repeats in a finite number M of periods of T and may be pre-computed and stored in memory. If all frequency shifts used by all mobiles are multiples of the basic frequency $2\pi/MT$, then all frequency shift sequences can be produced from the same pre-computed values stored in memory. For example, a shift sequence for 5dw is produced by selecting stored values from memory addresses sequentially incremented by 5, modulo-M.

When the sample processor 68 of FIG. 11 applies frequency shifts as described above to output samples of receiver 64 provided at a rate of one sample per chip, it has the particularly attractive property that the transmitted loop-back power spectrum is unaffected by the shift. That is, the mobile station's transmit power spectrum does not become shifted at all, and hence there is no increased risk of adjacent channel interference from the frequency shifting operations. This lack of spectrum change is because the frequency shift is modulo the sample rate, such that a portion of loop-back spectrum that would be expected to be shifted rightward out of the passband in fact reappears shifted into the passband on the left, or vice versa.

Figure 12A:
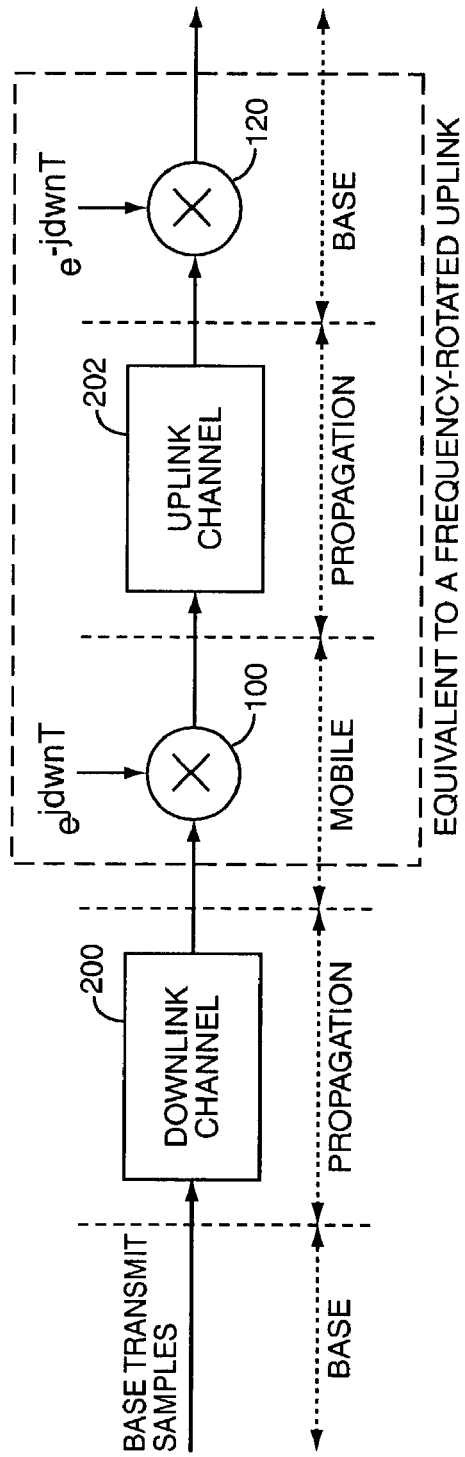
FIGS. 12A and 12B are diagrams of loop-back signal flow for frequency shift-based loop-back signal generation.
Figure 12B:
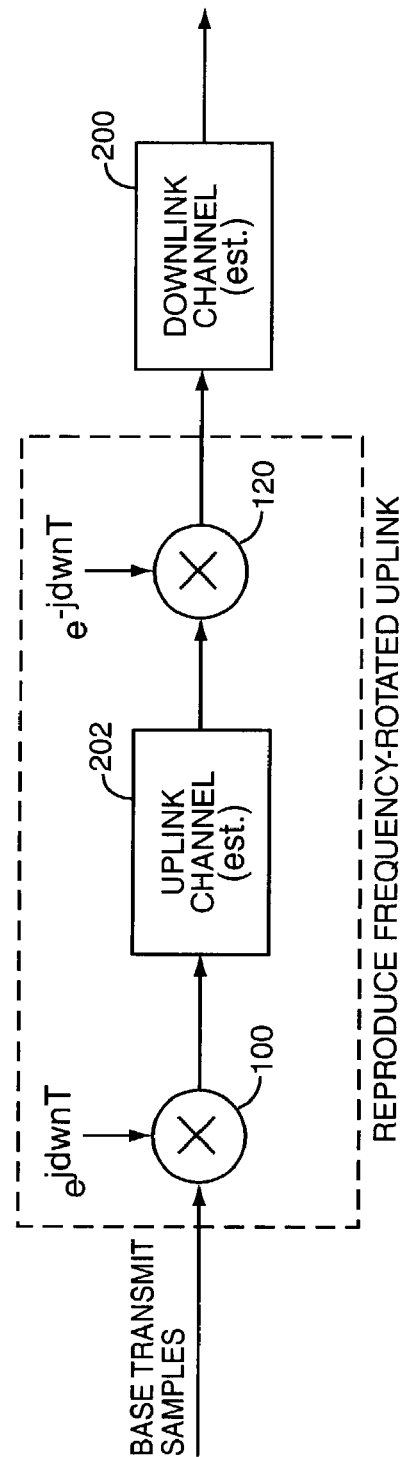

FIGS. 12A and 12B illustrate exemplary signal flows from the network 10 to the mobile 16 and back again, from which a better understanding of the exemplary modulo frequency shift method may be gained. Network 10 generates transmit signal samples at a base station 34 and transmits them through downlink channel 200, which may be defined, as discussed above, to comprise the transmit spectral shaping filter, the multipath propagation channel and the receive filter. Received samples at receiver 64 of a particular mobile station 16 are then frequency shifted modulo the sample frequency by multiplying by a frequency shift sequence in multiplier 100. An exemplary frequency shift is applied by taking one complex sample per chip, S(k), and multiplying the sample by the complex rotation factor $W^{km}$, where k is the sample index, m is the mobile station index, $W=e^{j2\pi/M}$, where M is the total number of mobile stations 16 in a particular group of interest, such as a particular plurality of mobile stations looping back to network 10 on the same CDMA channel frequency.

The spectrum of mobile station m, i.e., the mth mobile station 16, thereby gets rotated, within the same passband, by an amount $mF_s/M$, where $F_s$ is the chip rate. The modulo frequency shift has the effect that frequency components at a frequency f more than $F_s/2$ above the channel center frequency are wrapped around to appear below the center frequency by $(f-F_s)$ instead. The shifted frequency samples are then transmitted by the mobile station 16 though the uplink channel 202, which may be defined, as described above, to comprise mobile station transmit filtering, the uplink multipath channel, and base station receive filtering.

Samples out of the base station receiver are then shifted back in frequency by multiplying by the conjugate of the frequency shift sequence $W^{-km}$ in multiplier 120. The net frequency shift of any frequency component around the loop is thus nil; however, a frequency component at a frequency of f experiences the uplink channel frequency response at $|f+df|_{Fs}$ so that the apparent uplink frequency from the perspective of network 10 is rotated by an amount df because of the frequency shift imparted by the mobile station 16. As noted above, this type of modulo frequency rotation has the advantage that the mobile station's transmitted power spectrum remains unchanged, i.e., it remains centered on the allocated channel and not shifted into any adjacent channel.

The uplink and downlink channels (i.e., the network-stored estimates thereof) may thus still be interchanged at network 10 for advantageous loop-back signal processing as described above without affecting the loop-back samples providing the uplink channel estimate considers the frequency rotation applied by the mobile station 16. This equivalent signal flow path is shown in the FIG. 12B, which essentially reproduces the arrangement shown in FIG. 12A. The reproduced frequency-rotated uplink filtering is located at the network receive processing site, e.g., a base station 34. The output of the reproduced, frequency-rotated uplink, when input to the network's estimated downlink channel, produces an estimate of the actual loop-back signal. Since the loop-back signal is derived from a prior network-transmitted signal known to network 10, and since the actual loop-back signal is received by the network, such an arrangement allows the network 10 to solve for downlink channel estimation errors.

In order to estimate the downlink channel from the received loopback samples, the network 10 may implement the following exemplary method:
1. Estimate the uplink channel using an uplink pilot from the mobile station 16;
2. Frequency rotate the base-transmitted samples, pass these frequency rotated samples through the uplink channel estimated in (1), and then frequency de-rotate the output from the estimated uplink channel to obtain "reference samples" representative of loop-back sample values that have passed through a frequency shifted uplink channel but that have not passed through the downlink channel; and
3. After frequency de-rotating actual received loopback samples in, for example, derotator 120 or other such de-rotation circuits, correlating the de-rotated actual loopback samples with the reference samples computed in (2) to estimate the downlink channel.

It may also be realized that the de-rotation, which is applied both to the actual loop-back samples received by the network 10 in (3) and to the reference samples computed in (2), can be omitted without affecting the results of correlation.

Summarizing the above method steps, the loop-back signal received by network 10 from a particular mobile station 16 comprises modified sample values obtained by the mobile station 16 from a previous network-transmitted signal that is known to the network 10. As network 10 further has knowledge of the mobile-specific modification applied to those received signal samples at the mobile station 16, it can pass locally-stored (or re-generated) copies of those same sample values (but without any channel corruption) through a locally stored model of the frequency-rotated uplink channel to obtain the reference samples.

Since these reference samples differ from the actual loop-back signal samples received at network 10 primarily in that they have not passed through the downlink channel, passing such reference samples through the network's estimated downlink channel and then correlating or otherwise comparing them to the actual loop-back signal samples reveals errors in the network's downlink channel estimate. Of course, the reference samples further differ from the actual samples to the extent that the network's uplink channel estimate is in error, but since the uplink channel can be estimated directly based on received pilot information from the mobile station, the uplink channel models at network 10 tend to be quite accurate.

If each mobile station 16 uses frequency shifts that differ from any other mobile station 16 (in a given group of mobile stations 16) by a multiple of the reciprocal of the correlation averaging time in Step (3) above, their loop-back signals appear as uncorrelated interference and do not result in the network's estimation of downlink channels for each mobile station 16 being biased. In principle, by using for each mobile station 16 the appropriate frequency shift and de-rotation, the downlink channels for all mobile stations 16 may be jointly estimated by network 10, e.g., estimated by loop-back/channel processor 22, without ambiguity. Joint estimation compensates for the interference between mobile loop-back signals either by simultaneous (parallel) estimation or by successive estimation in which interference of already processed loop-back signals is subtracted before processing the next signal.

Exemplary successive joint estimation is carried out in descending order of signal strength, and may be iterated to improve the first estimations. A preferred realization of joint (parallel) estimation is developed in the Appendix, included herein, which allows the required hardware and/or software to be separated into an identical element or block which is repeated for each mobile station's loop-back signal. Such separate elements operate largely independently. Such an approach is significantly simpler than using matrix methods, which methods imply heavy cross coupling between channel estimations for different mobile stations 16.

The Appendix gives exemplary mathematical formulations for jointly estimating all coefficients for all channels at the same time, leading to the derivation of an optimum functional implementation as illustrated in FIG. 13. A base station transmitted signal sample stream T is applied to a set of models of the entire loop path, with one model for each mobile station 16 that is transmitting loop-back signals to the network 10, or at least for a particular group of mobile stations 16 looping back on, for example, the same CDMA channel(s). An exemplary model set comprises predictor circuits 130, including a predictor 132 for each mobile station 16, the collective outputs of which are coupled to corrector circuits 134 through a summing circuit that subtracts the actual composite loop-back signal received at a given network antenna 36 from the combination of predicted sample streams generated by predictor circuits 130. An exemplary arrangement of corrector circuits 134 comprises individual correctors 136 for each mobile station 16 of interest. The exemplary predictor 132 for each mobile station 16 provides for the following operations:

convolution with a downlink polynomial Dm(z);
application of a mobile-specific, modulo-frequency shift by multiplication of successive samples with successively increasing power of $W^m$;
addition of a mobile-specific pilot code Pm to assist in uplink channel estimation; and
convolution with an uplink polynomial Um(z).

The outputs of each predictor 132 represent the loop-back sample stream predicted for a particular mobile station 16 based on current network-stored estimates of the uplink and downlink channels relating that mobile station 16 to a particular network antenna 36. These predicted samples streams are then summed together and the actual composite loop-back signal received at the antenna 36 is subtracted from them, yielding an error signal (error sample stream) that is processed by the corrector circuits 134.

The error sample stream is non-zero due to noise, any mobile station transmissions that are not modeled, and errors in the network's uplink and downlink models. The error sample stream can be applied to decoders (not shown) for mobile station signals that are not using loop-back, so that these signals can be decoded after subtraction of all loop-back interference. Thus configured, the loop-back signals do not interfere with conventional traffic from mobile stations 16, even from those not participating in loop-back.

The error sample stream can also be multiplied with the uplink reference signals and downlink reference signals derived in the Appendix to determine the amount of error in each coefficient of the uplink and downlink polynomials for each mobile station 16. These errors may be used immediately, on a sample-by-sample basis, to update the channel polynomials, but since such updating might require high-speed processing, the errors may also be averaged over a suitable period, with the resultant average errors used to update the channel polynomials less frequently. For example, the errors may be averaged over 256 chips, which averaging imposes a delay of 66.66 μs at an exemplary chip rate of 3.84 Mega-chips-per-second (Mcps). A delay of this amount is small enough to allow the channel changes due to reasonable mobile station speeds to be tracked. The tracking rate and accuracy depends on how the channel coefficients are updated using the average errors dumped every 66 uS from the corrector circuits 134. An exemplary update method employs a second-order tracker that also estimates rate-of-change of channel coefficients. The exemplary second-order tracker tracks a constant rate-of-change of channel coefficients with no static error.

A further advantage of the apparatus of FIG. 13 is that it allows the implementation to be separated into functional elements, hardware and/or software, that are associated with individual loop-back signals, with the elements for different signals operating substantially independently, apart from the summation of the predictor outputs. Thus, the complexity of the computational arrangement for loop-back processing scales essentially in direct proportion to the number of loop-back signals being processed, thereby making the implementation eminently practicable.

Figure 14:
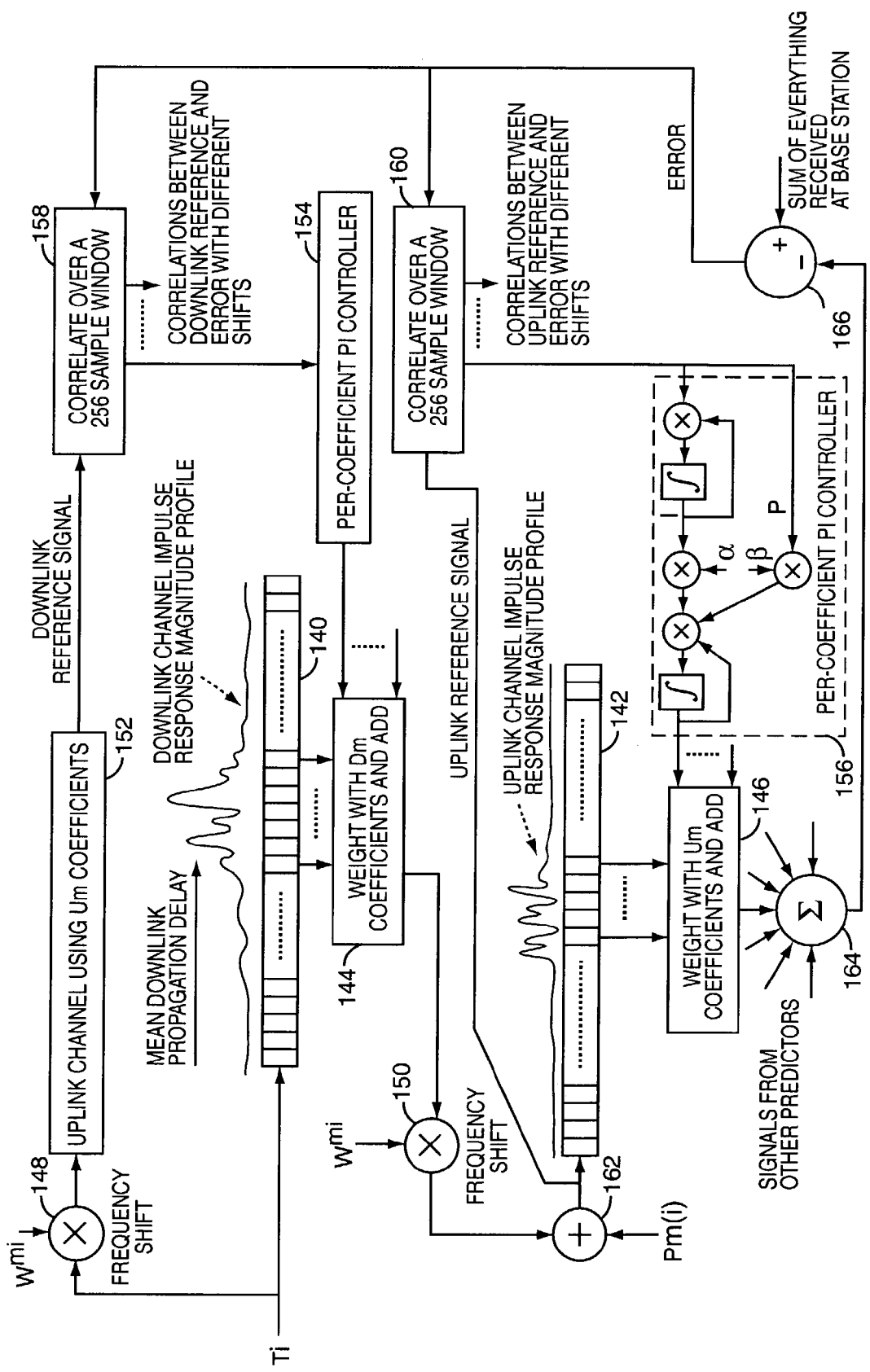
FIG. 14 is a diagram of exemplary per-mobile station predictor and corrector functional and circuit details.

Exemplary details for processing an individual loop-back signal for a particular mobile station 16 are illustrated in FIG. 14. The illustrated arrangement may be implemented as part of loop-back signal/channel processor 22 within transmit processor 18, but also might be at least partially implemented in individual network transceiver stations 12, e.g., base stations 34, for corresponding network antennas 36. Regardless, the transmit signal T being transmitted from a particular network antenna 36 is applied to delay memory 140, which represent modeled downlink propagation delays relating transmissions from that antenna 36 to a particular mobile station 16. Delayed samples are tapped out at each delay corresponding to a multipath ray to be tracked; the ray-corresponding samples are weighted with downlink channel coefficients in weighting block 144 and added. The output of weighter/adder 144 is what the mobile station 16 is estimated to receive based on the network's current downlink channel estimate for that mobile station 16. The mobile-specific frequency shift that the mobile station 16 will apply to the loop-back signal is then applied in phase rotator (complex multiplier) 150, which multiplies successive values of the predicted samples by increasing powers of $W^m$. The frequency shifted signal is then combined with the mobile-specific pilot code Pm(i) in summing circuit 162 in any one of the ways previously disclosed, i.e. linear addition, time-multiplexing etc. The loop-back/pilot combination, which is what the mobile station 16 would transmit back to the network 10, is then applied to delay memory 142, which represents currently estimated uplink propagation delay for the mobile station 16.

Delayed samples from this memory are tapped out corresponding to uplink multipath rays to be tracked, with the ray-corresponding samples weighted using uplink channel coefficients and added in weighter/adder 146. The output of weighter/adder represents what the network anticipates receiving from the mobile station 16, denoted as the mth mobile station. Summing this signal stream in adder 164 with the output of all other predictors 132 for the other mobile stations 16 that are transmitting loop-back signals back to network 10 yields the composite loop-back signal the network expects to receive on antenna 36. This is subtracted from the actual received signal samples in differencing node 166 to yield an error sample stream representing the differences between the predicted composite sample stream for the group of mobile stations 16 and the actual composite sample stream received on antenna 36.

The error sample stream is non-zero if there are errors in any network-estimated channel coefficient. By correlating with the sample stream of delay memory 142 that is weighted by a particular uplink coefficient, the amount of error associated with that coefficient may be deduced. Thus, the sample stream input from summing node 162 to uplink delay memory 142 is used as a reference sample stream to be correlated with the error sample stream in correlator 160. Correlator 160 correlates with the uplink reference signal delayed by each delay corresponding to a coefficient to be tracked. Each correlation involves multiplying an error sample by conjugate of a delayed reference sample and accumulating the result. The result may be accumulated over a period of 256 samples, for example, so that a subsequent tracker circuit 156 for the uplink channel need only manage values at ½56th of the chip rate.

An exemplary implementation for coefficient tracker 156 is configured to act as a tracking loop for a corresponding channel coefficient; thus, a channel tracker for tracking the uplink (or downlink) channel for a particular mobile station, would employ as many coefficient trackers 156 as there were channel coefficients. An exemplary embodiment of the coefficient-tracking loop implemented by coefficient tracker 156 uses a Proportional-Integral (PI) controller implementation. Thus, the corresponding error correlation is accumulated (integrated) in a first accumulator to produce the integrated (I) signal. The I output is then weighted by a factor $\alpha$ and added to the non-integrated or proportional error signal P weighted by a factor $\beta$. Together, $\alpha$ and $\beta$ determine the tracking loop bandwidth and damping, and there may be motivations to choose these differently for different mobile stations, depending on their speed, and to choose them in dependence on the mean value of the coefficient being tracked, so that, for example, weaker rays are filtered more than stronger rays. The weighted sum of the P and I terms is then integrated in another accumulator to produce an updated coefficient value, thus creating a second-order servo system for tracking each coefficient.

The downlink coefficients for the downlink channel to the mobile station 16 are tracked in an analogous way, except that exemplary tracking of the downlink channels takes advantage of the previously discussed interchangeability of the uplink and downlink channels. Thus, the base station transmit sample stream T is first frequency shifted in phase rotator (complex multiplier) 148 and passed through the estimated uplink channel block 152 using the same uplink channel coefficients as used in weighter/adder 146. This action generates a sample stream, which, if passed through the downlink channel, should yield the loop-back signal. Thus, the output sample stream of channel block 152 is correlated with the error sample stream in correlator 158 to isolate errors in the downlink channel coefficients, which are each then subject to an associated channel coefficient tracker 154 as described above to produce continually updated estimates of the downlink channel coefficients for the mobile station 16.

Those skilled in the art will recognize that, as noted earlier, one or more DSPs and/or other processors or processing devices may be used to implement the functional circuits illustrated in FIGS. 13 and 14, and to implement variations thereof, as needed or desired. In particular, all of the coefficient trackers 154 and 156 implemented for each mobile station 16 may share a common DSP, as the processing rate for each is ½56th of the exemplary chip rate. In some embodiments, advantages may be gained by implementing correlators 158 and 160 in dedicated processing resources, such as in a dedicated ASIC and/or FPGA, as the typical processing rates are high (equal to the chip rate, for example). Likewise, the delay memories 140 and 142, along with weighting/adding units 144 and 146, function as Finite Impulse Response (FIR) filters that may be advantageously implemented in dedicated hardware. Of course, all such design choices may be altered as needed or desired according to prevailing circumstances.

Figure 15:
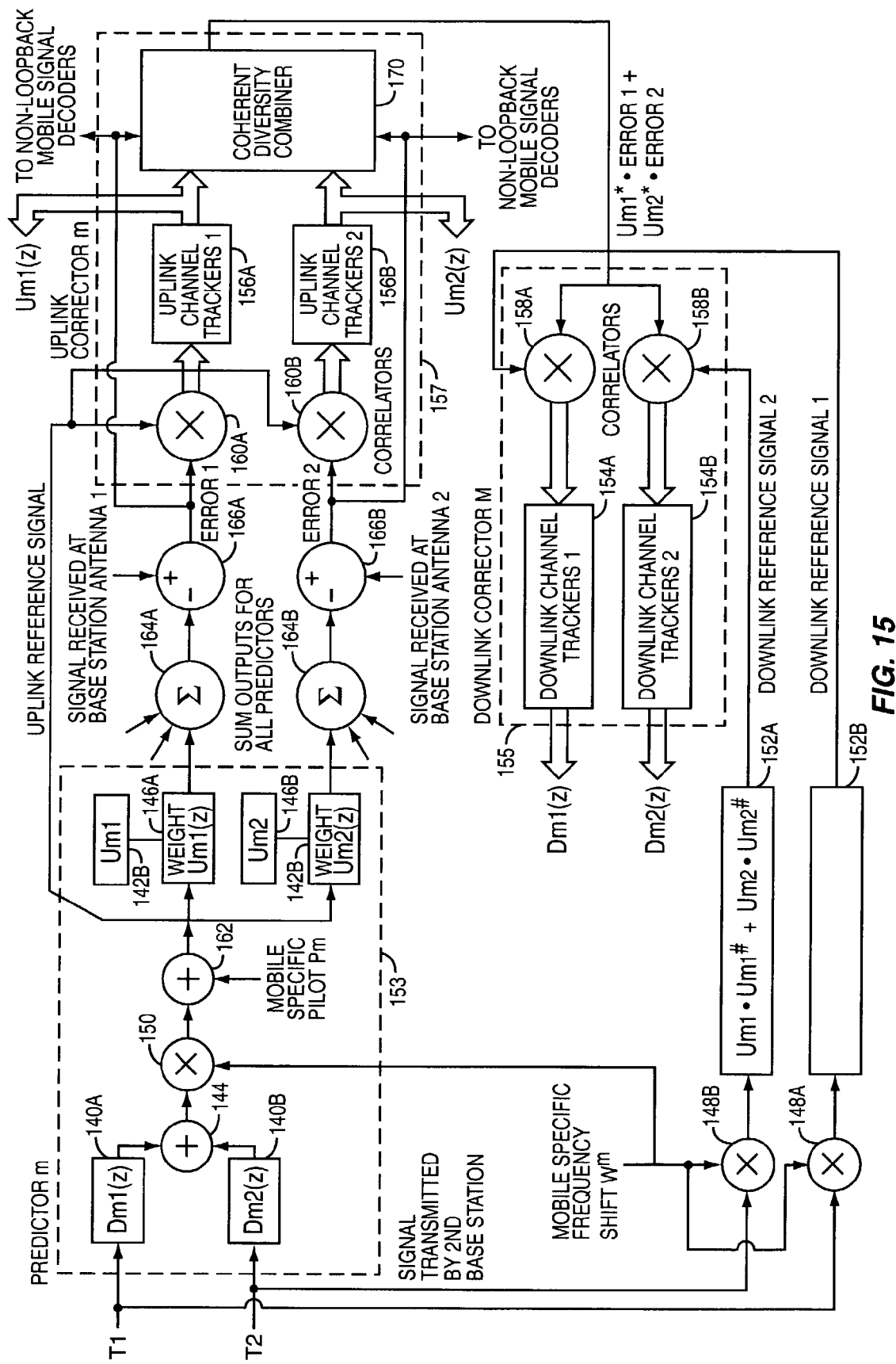
FIG. 15 is a diagram of exemplary per-mobile station predictor and corrector functional and circuit details expanded to consider two or more network antennas.

In expanding the explanation from the per loop-back signal of FIG. 14, FIG. 15 illustrates estimation of uplink and downlink channels for multiple network transmitting and receiving antennas, i.e., for a coherent macrodiversity application as described in the parent applications. The signals T1 and T2 are the transmit sample streams transmitted by respective network antennas 36 (denoted as Antenna 1 and Antenna 2) and are, in an exemplary embodiment, Gaussian-noise-like signals that are the sum of all mobile-directed CDMA signals. Predictor(m) predicts what network antennas 1 and 2 will receive looped back from a particular mobile station, denoted as mobile(m), base on:

applying the downlink channel polynomial $Dm1(z)$ to T1 and $Dm2(z)$ to T2 in FIR filters 140A and 140B, respectively, and summing the result in summing circuit 144 to predict what mobile(m) will receive;

applying mobile-specific frequency shift used by mobile (m) in phase rotator (complex multiplier) 150 and adding a mobile-specific pilot sequence Pm in summing circuit 162 to predict what mobile(m) transmits;

passing the predicted mobile transmit signal through uplink channel polynomials $Um1(z)$ and $Um2(z)$ (from 142A and 142B) using FIR filters 146A and 146B to determine what will be received from mobile(m) at network antennas 1 and 2, respectively;

adding predicted loop-back signals from all mobile predictors in summing circuits 164A and 164B to determine the total (combined) signals expected to be received from all loop-back mobile stations 16 at network antennas 1 and 2, i.e., to predict the composite loop-back signal received by each antenna;

subtracting the predicted composite loop-back signals from the composite loop-back signals actually received at antennas 1 and 2 in differencing circuits 166A and 166B, respectively, to obtain Error Signal 1 and Error Signal 2;

correlating Error Signal 1 and Error Signal 2 with the predicted mobile loop-back signal in correlators 160A and 160B to determine how much of the error is related to errors in respective uplink channel coefficients (the correlators multiply shifts of the error signals with the conjugate of the predicted loopback signal and average over some suitable period such as 256 chips);

applying the correlator outputs for each shift to uplink channel trackers 156A and 156B, which correct the coefficients for uplink channel polynomials ($Um1(z)$ and $Um2(z)$) for the respective network receive antennas;

filtering the error signals using the time-reverse-conjugates of respective uplink channel polynomials, denoted by $Um1^{\#}$ and $Um2^{\#}$ and adding, and thereby achieving coherent diversity combination of all multipath rays; and correlating the diversity-combined error signal for mobile (m) with the downlink reference signals in correlators 158A and 158B to determine errors in the downlink channel polynomial coefficients of $Dm1(z)$ and $Dm2(z)$.

The downlink reference signals are determined using the principle of interchangeability of the diversity combined uplink, now $Um1 \times Um1^{\#} + Um2 \times Um2^{\#}$, and the respective downlink. Thus, passing copies of T1 and T2 through the mobile-specific frequency shifters 148A and 148B, and then through the diversity combined uplink channel using FIR filters 152A and 152B yields signals which, when passed through respective downlinks and added, yield the predicted loop-back signal. Therefore, correlating the outputs of FIR filters 152A and 152B with the diversity combined error signal for mobile(m) yields errors in the downlink polynomial coefficients of $Dm1(z)$ and $Dm2(z)$, i.e., yields downlink channel estimation errors for mobile(m) relative to antennas 1 and 2.

These errors are applied to respective channel trackers 154A and 154B to track the downlink channels, remembering that exemplary channel trackers may be comprised of the PI-based channel coefficient trackers 154 described for tracking-loop maintenance of downlink channel coefficients in FIG. 14. The latest estimates of Dm1(z) and Dm2(z) produced by downlink corrector 155 are fed back to FIR filters 140A and 140B, and the latest uplink channel estimates of Um1(z) and Um2(z) from uplink corrector 157 are fed back to FIR filters 146A/B, and 152A/B.

One or more exemplary embodiments of the channel trackers 154A/B and 156A/B provide a second-order lowpass filtering function that passes the highest expected Doppler components and attenuates noise and other error components at higher frequencies. A typical cut-off frequency for such a low-pass function would be 200 Hz for dealing with Doppler-imposed frequency shifts on an assumed 2 GHz transmit signal carrier frequency for mobile stations 16 in vehicles moving at normal speeds. Note also that Error Signals 1 and 2 may be fed to non-coherent macrodiversity combiners and then decoders for mobile stations not employing loop-back transmission.

It will be appreciated that the arrangement of FIG. 15 can be extended to any number of network antennas and any order of antenna or macro-diversity with at worst only proportional increases in complexity. Less than a proportional increase in complexity may be realized by combining the FIR filtering functions, e.g., FIR filters 140A/B, etc., for multiple network antennas in a single signal processor, and the number that can be so integrated rises with the inexorable progress in chip technology postulated by Moore's law.

In any case, the channel polynomials determined by the above method and apparatus can be used to implement any of the interference cancellation schemes disclosed in the parent applications. For example, the adjoint of the matrix of uplink channel polynomials can be used to separate uplink signals from different mobile stations 16, including uplink traffic multiplexed with loop-back and pilot sequences.

As another example, the downlink polynomials can be used together with models of the mobile station RAKE receivers to predict soft values obtained at RAKE receiver outputs of the mobile stations, which can then be correlated with the intended symbol steams to produce an interference coupling matrix at the symbol stream level. The inverse of this matrix can be applied to the symbols streams prior to CDMA encoding at the network transmitters, as disclosed in the parent applications, to cancel downlink interference.

The present invention thus provides loop-back signal generation and processing methods and apparatus that enable a wireless communication network, such as a CDMA-based cellular radio network, to deduce both uplink and downlink channel propagation characteristics relating one or more mobile stations to one or more network transmit and receive antennas. Such channel characteristics may be maintained at the network for use in, transmit signal precompensation, and may be represented as impulse response polynomial coefficients. Regardless, the present invention is applicable to CDMA and non-CDMA networks, and scalable to any number of remote receivers and any number of participating network antennas or antenna sites with only proportional increases in complexity.

Moreover, the above disclosure provides details regarding exemplary embodiments of the present invention and should not be construed as limiting its scope. Indeed, the present invention is limited only by the scope of the claims following the Appendix below, and the reasonable equivalents thereof.

APPENDIX

Matrix-based methods are disclosed in the below discussion, and such methods present exemplary details for jointly solving for all uplink and downlink channel coefficients to all mobile stations. Because of cross-interference between the loop-back signals from different mobile stations, the inverse of their autocorrelation matrix is used to separate them. However, the complexity of such a solution increases faster than the number of mobile stations squared. Moreover, the solution generally cannot be partitioned into a repetition of a basic computational elements on a per-mobile basis, thus comprising easy scalability.

In one approach, the autocorrelation matrix for the loop-back signals need not be inverted, but rather approximated to diagonal, if the uncompensated mutual interference is low enough. Further, an alternative based on successive approximation methods that avoid the need for matrix inversion is also presented herein. Even so, such block-matrix solutions may still not be amenable to easy partitioning into corresponding computational elements that provide for simplified, proportional scalability.

Thus, the methods disclosed herein further describe an interference subtraction method, which, in an exemplary embodiment, is illustrated in accompanying FIG. 13. While FIG. 13 illustrates the single base station antenna case, the above discussion further develops the method for the multiple base station antennas case as might be used in a coherent macrodiversity environment.

In any case, an overriding principle is to track changing conditions and update the network's uplink and downlink channel estimates so that the latest values of the channel estimates can be used at the network together with knowledge of the network-transmitted signals to predict what all mobile stations will loop back to the network. The sum of these predictions, a predicted composite loop-back signal, is subtracted from the sum of the loop-back signals actually received at the network, the actual composite loop-back signal, thereby leaving only prediction error.

The prediction error is then correlated with reference signals generated by the network based on its current channel estimate information to resolve the components of the error associated with each tracked channel coefficient. Thus, the method effectively estimates each channel tap for each mobile station after interference due to the other taps and mobile stations has been subtracted. As used here, the term "channel tap" denotes the channel model filter for a particular multipath propagation ray being tracked for a particular mobile station on the uplink or downlink channels.

Let the network station transmit a sequence of samples T(i) from a given network antenna. Thus, mobile 1 receives $$R1(i) = \sum_k C1_k T(i-k),$$

where $C1_k$ are the downlink taps for mobile i. Mobile 1 loops back the above received samples with no frequency shift.

Mobile 2 receives $$R2(i) = \sum_k C2_k T(i-k)$$

where $C2_k$ are downlink taps for mobile 2. Mobile 2 loops back $$W^i \sum_k C2_k T(i-k)$$

where W is a phase shift per sample corresponding to a frequency shift.

Thus, the network receives the looped back samples from mobiles 1 and 2 through respective uplink channels $U1_j$ and $U2_j$, giving $$\sum_k \sum_j [U1_j C1_k + W^{i-j} U2_j C2_k] T(i-j-k) =$$

$$\sum_k C1_k \sum_j U1_j T(i-j-k) + \sum_k C2_k W^k \sum_j W^{i-j-k} U2_j T(i-j-k) =$$

$$\sum_k C1_k V1(i-k) + \sum_k C2_k W^k V2(i-k),$$

where $V1(i) = \sum_j U1_j T(i-j)$ and $V2(i) = \sum_j U2_j W^{i-j} T(i-j)$ are reference samples computed from the known transmitted sequence T and the estimated uplink channels U.

Thus, the received composite loop-back signal, given as, $$\sum_k C1_k V1(i-k) + \sum_k C2_k W^k V2(i-k)$$

is now correlated with different shifts of $V1^*$ in order to extract $C1_k$ and with different shifts of $V2^*$ to extract $C2_k$. Firstly, the loop-back signal is multiplied by $V^*1(i-q)$ and summed over i giving $$\sum_k C1_k \sum_i V1(i-k)V1^*(i-q) + \sum_k C2_k W^k \sum_i V2(i-k)V1^*(i-q) =$$

$$\sum_k C1_k X1(k-q) + \sum_k C2_k W^k Y1(k-q) = Q1q,$$

where X1 is the autocorrelation function of V1 and Y1 is the cross correlation function of V2 and V1. X1 and Y1 can also be regarded as Toeplitz matrices and the above written as:

[X1](C1)+[Y1][W](C2)=(Q1)

where C1 is a vector of the unknown downlink channel taps to mobile 1,

C2 is a vector of the unknown downlink channel taps to mobile 2,

W is a diagonal matrix of power of the phase rotation per sample and Q is a vector of the values $Q_q$ for different integer shifts q of the correlating reference samples streams.

The received loop-back signal is now correlated with $V2^*$, thereby obtaining:

$$Q2_q =$$

$$\sum_k C1_k \sum_i V1(i-k)V2^*(i-q) + \sum_k C2_k W^k \sum_i V2(i-k)V2^*(i-q) =$$

$$\sum_k C1_k Y1^*(q-k) + \sum_k C2_k W^k X2(k-q),$$

where X2 is the autocorrelation function of V2. The cross-correlation Y1 of V1 and V2 appears again in the above, but conjugated and sequence-reversed, for which we use the symbol "#" as indicated below.

In matrix form, this operation is expressed as,

[Y1#](C1)+[X2][W](C2)=(Q2). The two matrix forms may then be combined into the single equation, which yields:

$$\begin{bmatrix} X1 & Y1 \\ Y1^\# & X2 \end{bmatrix} \begin{pmatrix} C1 \\ [W]C2 \end{pmatrix} = \begin{pmatrix} Q1 \\ Q2 \end{pmatrix}.$$

The above, may then be solved to yield, $$\begin{pmatrix} C1 \\ [W]C2 \end{pmatrix} = \begin{bmatrix} X1 & Y1 \\ Y1^\# & X2 \end{bmatrix}^{-1} \begin{pmatrix} Q1 \\ Q2 \end{pmatrix}.$$

In the case of many more than the two mobile stations dealt with above, one can use extrapolation to obtain the solution:

$$\begin{pmatrix} C1 \\ C2 \\ C3 \\ \vdots \\ Cm \end{pmatrix} =$$

$$\begin{bmatrix} W1^* & & & & \\ & W2^* & & & \\ & & W3^* & & \\ & & & \ddots & \\ & & & & Wm^* \end{bmatrix} \begin{bmatrix} X1 & Y12 & Y13 & \ldots & Y1m \\ Y12^\# & X2 & Y23 & \ldots & Y2m \\ Y13^\# & Y23^\# & X3 & Y34 & Y3m \\ \vdots & & & \ddots & \vdots \\ Y1m^\# & \ldots & \ldots & \ldots & Xm \end{bmatrix}^{-1} \begin{pmatrix} Q1 \\ Q2 \\ \vdots \\ \vdots \\ Qm \end{pmatrix}$$

Where Wi are diagonal matrices of the phase rotation sequences representing the mobile-specific frequency shifts applied by each mobile station in generating its loop-back signal.

Computing the inverse of the auto- and cross-correlation matrices is not necessarily the most efficient way of solving for the channel taps Ci. A first approximation can be obtained by using only the diagonal elements of the matrix, ignoring the off-diagonal elements. This is tantamount to ignoring interference between mobile station loop-back signals and interference between channel taps of the same mobile station. Such operations may be adequate if the number of chips over which the correlations are performed (summation index i) is large compared with the total number of channel taps being estimated.

Moreover, the summation or integration times should be sufficiently short to avoid delays in obtaining the solution, so that the derived channel is substantially current. Typically, a delay of less than 0.3 ms allows satisfactory tracking of changing uplink and downlink channels for a mobile station moving at normal highway speeds. For a system chip rate of 3.84 Mcps, summation over 1024 chips could be used. This summation length would allow, for example, the determination of perhaps the eight largest downlink channel tap for eight simultaneously looping-back mobile stations.

A preliminary procedure would be used to determine which eight of all the possible taps delays corresponding to the multipath propagation rays were the largest for each mobile station. Such a tap search procedure, although used for other purposes, is known in RAKE receivers for decoding CDMA signals. A second, improved approximation may be obtained by combining the first approximation with the off-diagonal matrix elements ignored in the first solution, and subtracted from the Q vector. This is tantamount to subtraction of cross-interference. Multiplying the modified Q-vector with the reciprocal of the diagonal elements yields the second approximation. This procedure may be reiterated if desired.

Another successive approximation method can be derived as follows: let the auto-/cross-correlation matrix be expressed as L+D+U where D are the diagonal elements and L and U are the upper and lower triangles of off-diagonal elements. Then (L+D+U)=D(I+D(L+U)). Continuing, let $\Delta=-D^{-1}(L+U)$. Therefore, $(L+D+U)^{-1}=(I-\Delta)^{-1}D^{-1}=\ldots (I+\Delta^4)(I+\Delta^2)(I+\Delta)D^{-1}$.

The above suggests first multiplying the Q-vector with the reciprocal diagonal elements, and then with the matrix I+Δ repeatedly, successively squaring Δ for each repeat. Thus, this solution converges if successive squares of the off-diagonal element matrix themselves converge.

As noted, however, the above block-solutions involving matrices can be onerous for large numbers of mobiles and channel taps. An alternative successive approximation method is to update the channel taps by a small amount upon receipt of each new signal sample at the network, using a sequential least-squares estimating approach, such as Kalman filtering or Steepest Descent. The Steepest descent method is equivalent to a fixed, unit P matrix, and is simpler to implement as it avoids matrix operations.

Thus, an exemplary alternate method comprises using the current estimates of the uplink and downlink channel taps, along with the known signal transmitted by a network base station to predict the composite signal sample that should be received by the network, where that composite signal is the sum of all mobile station transmissions. The error between the prediction and the actual received samples is then computed. The channel taps are then updated in proportion to the derivatives of the error with respect to each tap.

The prediction of the received sample as the sum of M mobile loopback signals is given as:

$$\hat{S}i = \sum_{m=1}^{M} \sum_j W^{m(i-j)} Um_j \sum_k Cm_k T(i-j-k),$$

where the loopback frequency-shift increases in equal steps in proportion to mobile index m. The error between the actual received signal sample Si and the prediction $\hat{S}i$ is simply, $Ei=\hat{S}i-Si$.

The sequential least-squares method adjusts the channel taps U and C in the direction that would reduce Ei the most for the least change in the channel tap values, referred to as the direction of Steepest Descent. The adjustment does not, however, go all the way to the values that would have given a zero Ei, but only part of the way to thereby avoid "bouncing around" on noise-induced signal perturbation. This results in the solution being that which best accords the predictions with the received samples on average.

The direction in which the tapes should be adjusted is given by $$\frac{\partial Ei}{\partial Cmq} = W^{m(i-q)} \sum_k Cm_k T(i-q-k) \quad \text{for the Uplink taps}$$

and $$\frac{\partial Ei}{\partial Cmq} = \sum_j W^{m(i-j)} Um_j T(i-j-q) \quad \text{for the downlink taps.}$$

The set of all partial derivatives arranged as a column vector is the Gradient (GRAD) vector of the error with respect to the channel taps.

The channel taps arranged likewise as a column vector $$\begin{pmatrix} U \\ C \end{pmatrix}$$

are then adjusted by the vector amount −αEiGRAD, where α is chosen to be less than unity to provide the desired amount of averaging.

By examining the equation for $\hat{S}i$ it will be realized that the above cannot be expected to uniquely separate the downlink channel to a mobile from the uplink channel from the mobile. Additional information is required that pertains to one or other direction alone. This is provided by adding mobile-specific pilot symbols Pmi to the loopback samples at least some of the time.

What is claimed is:

1. A method of generating a loop-back signal at a mobile station for use in downlink channel estimation by a wireless communication network comprising:
   receiving a network-transmitted signal as a received signal at a mobile station;
   obtaining signal samples from the received signal;
   applying a mobile-specific modification to the signal samples; and
   transmitting the modified signal samples from the mobile station to the network in a loop-back signal.

2. The method of claim 1, wherein applying a mobile-specific modification to the signal samples comprises imparting characteristic phase rotations to the signal samples such that the loop-back signal received at the network from the mobile station has a characteristic frequency shift that is unique to the mobile station.

3. The method of claim 1, wherein receiving a network-transmitted signal as a received signal at a mobile station comprises receiving a CDMA signal that includes coded signals for a plurality of mobile stations.

4. The method of claim 1, wherein applying a mobile-specific modification to the signal samples comprises gating the signal samples for generation of the transmit signal according to mobile-specific timing such that transmitting the modified signal samples from the mobile station comprises transmitting gated signal samples in the loop-back signal.

5. The method of claim 1, wherein applying a mobile-specific modification to the signal samples comprises multiplying the signal samples by a mobile-specific code value.

6. The method of claim 1, wherein obtaining signal samples from the received signal comprises obtaining complex samples at a sampling rate matched to a chip rate of the received signal.

7. The method of claim 6, wherein applying a mobile-specific modification to the signal samples comprises frequency shifting the complex samples modulo the sampling rate in accordance with a mobile-specific frequency shifting sequence.

8. The method of claim 1, wherein applying a mobile-specific modification to the signal samples comprises multiplying the signal samples by a frequency shift sequence.

9. The method of claim 8, wherein multiplying the signal samples by a frequency shift sequence comprises, for each signal sample, multiplying the signal sample by a corresponding complex rotation factor.

10. The method of claim 9, wherein multiplying the signal sample by a corresponding complex rotation factor comprises multiplying the signal sample by a selected one in a sequence of complex rotation factors indexed by signal sample number.

11. The method of claim 1, further comprising determining a mobile station identifier at the network and transmitting the mobile station identifier to the mobile station for use in determining the mobile-specific modification applied to the signal samples.

12. The method of claim 11, wherein determining a mobile station identifier at the network comprises determining a mobile station index number for use in uniquely identifying the mobile station within a group of mobile stations.

13. The method of claim 12, wherein applying a mobile-specific modification to the signal samples comprises applying a characteristic frequency shift sequence to the signal samples that is based on the mobile station index, such that each mobile station in the group of mobile stations imparts a characteristic frequency shifting sequence to the signal samples in its loop-back signal.

14. The method of claim 1, wherein applying a mobile-specific modification to the signal samples comprises rotating the phase of successive signal samples by a progressively increasing phase shift corresponding to a frequency shift specific to the mobile station.

15. The method of claim 14, wherein the received signal is a CDMA signal transmitted by the network, and wherein obtaining signal samples from the received signal comprises sampling the received signal at a sample rate matched to a CDMA chip rate such that the frequency shift is a spectrum rotation modulo the sample rate, thereby leaving the loop-back signal spectrum substantially the same as the received signal spectrum.

16. The method of claim 14, further comprising combining a pilot code sequence with the modified signal samples obtained by phase rotation and transmitting the combination of modified signal samples and the pilot code sequence back to the network as the loop-back signal.

17. The method of claim 16, wherein combining a pilot code sequence with the modified signal samples comprises time-division multiplex combining.

18. The method of claim 16, wherein combining a pilot code sequence with the modified signal samples comprises additive combining.

19. A mobile station to generate a loop-back signal for use in downlink channel estimation by a wireless communication network comprising:
a receiver to receive a network-transmitted signal as a received signal and obtain signal samples therefrom;
a sample processor to apply a mobile-specific modification to the signal samples obtained from the received signal; and
a transmitter to transmit a loop-back signal based on the modified signal samples back to the network.

20. The mobile station of claim 19, wherein the sample processor comprises a digital circuit included in a baseband processor of the mobile station.

21. The mobile station of claim 19, wherein the sample processor applies a mobile-specific modification to the signal samples by imparting characteristic phase rotations to the signal samples such that the loop-back signal received at the network from the mobile station has a characteristic frequency shift that is unique to the mobile station.

22. The mobile station of claim 19, wherein the mobile station receives the network-transmitted signal as a CDMA signal that includes coded signals for a plurality of mobile stations.

23. The mobile station of claim 19, wherein the mobile station applies a mobile-specific modification to the signal samples by gating the signal samples for generation of the transmit signal according to mobile-specific timing such that transmitting the modified signal samples from the mobile station comprises transmitting gated signal samples in the loop-back signal.

24. The mobile station of claim 19, wherein the mobile station applies a mobile-specific modification to the signal samples by multiplying the signal samples by a mobile-specific code value.

25. The mobile station of claim 19, wherein the receiver obtains signal samples from the received signal by obtaining complex samples of the received signal at a sampling rate matched to a chip rate of the received signal.

26. The mobile station of claim 25, wherein the sample processor applies a mobile-specific modification to the signal samples by frequency shifting the complex samples modulo the sampling rate in accordance with a mobile-specific frequency shifting sequence.

27. The mobile station of claim 19, wherein the sample processor applies a mobile-specific modification to the signal samples by multiplying the signal samples by a mobile-specific frequency shift sequence.

28. The mobile station of claim 27, wherein the sample processor multiplies each signal sample by a corresponding complex rotation factor.

29. The mobile station of claim 28, wherein the sample processor multiplies each signal sample by a selected one in a sequence of complex rotation factors indexed by signal sample number.

30. The mobile station of claim 19, wherein the mobile station determines the mobile-specific modification applied to the signal samples based on receiving a mobile station identifier from the network.

31. The mobile station of claim 30, wherein the mobile station identifier comprises a mobile station index number for use in uniquely identifying the mobile station within a group of mobile stations.

32. The mobile station of claim 31, wherein the sample processor applies a mobile-specific modification to the signal samples by applying a characteristic frequency shift sequence to the signal samples that is based on the mobile station index, such that each mobile station in the group of mobile stations imparts a characteristic frequency shifting sequence to the signal samples in its loop-back signal.

33. The mobile station of claim 19, wherein applying a mobile-specific modification to the signal samples comprises rotating the phase of successive signal samples by a progressively increasing phase shift corresponding to a frequency shift specific to the mobile station.

34. The mobile station of claim 33, wherein the received signal is a CDMA signal transmitted by the network, and wherein the mobile station obtains signal samples from the received signal by sampling the received signal at a sample rate matched to a CDMA chip rate such that the frequency shift is a spectrum rotation modulo the sample rate, thereby leaving the loop-back signal spectrum substantially the same as the received signal spectrum.

35. The mobile station of claim 33, wherein the mobile station combines a pilot code sequence with the modified signal samples obtained by phase rotation and transmits the combination of modified signal samples and the pilot code sequence back to the network as the loop-back signal.

36. The mobile station of claim 35, wherein the mobile station combines a pilot code sequence with the modified signal samples by time-division multiplex combining.

37. The mobile station of claim 35, wherein the mobile station combines a pilot code sequence with the modified signal samples by additive combining.

38. A method of enabling the generation of individual loop-back signals by a plurality of mobile stations to be used in downlink channel estimation by a wireless communication network comprising:

determining one or more index values for each mobile station to be used by the mobile station in generating a mobile-specific loop-back signal for return transmission to the network; and transmitting the one or more index values for each mobile station from the network to each mobile station;

transmitting a count value for receipt by the mobile stations; and each mobile station forming its mobile-specific loop-back signal by imparting a mobile-specific frequency shift derived from the index and count values to signal samples obtained from a signal transmitted by the network to the mobile station.

39. The method of claim 38, wherein determining one or more index values for each mobile station comprises assigning an index value to each mobile station that uniquely identifies the mobile station within the plurality of mobile stations.

40. The method of claim 39, wherein assigning an index value to each mobile station comprises assigning index values to mobile stations as each mobile station is admitted to the network for service.

41. The method of claim 30, wherein assigning an index value to each mobile station comprises:

identifying the plurality of mobile stations as a particular group of mobile stations;

indexing the group of mobile stations; and transitting an index value to each mobile station that uiquely identifies that mobile station within the particular group of mobile stations.

42. The method of claim 38, futher comprising receiving the individual loop-back sigals from the moble stations as one or more composite loop-ack signals received at one or more netwrok antennas.

43. The method of claim 42, further comprising identifying individual loop-back signals within the composite loop-back signals based on knowledge of the mobile-specific frequency shift applied by each mobile station.

44. The method of claim 42, further comprising processing the one or more composite loop-back signals to obtain downlink channel estimates relating the one or more network antennas to each mobile station based on applying mobile-specific frequency de-shifting to the one or more composite loop-back signals based on knowledge of the mobile-specific frequency shift applied by each mobile station.

* * * * *